(12) United States Patent
Seok

(10) Patent No.: US 9,900,878 B2
(45) Date of Patent: Feb. 20, 2018

(54) DYNAMIC RESOURCE ALLOCATION IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 82 days.

(21) Appl. No.: 14/880,176

(22) Filed: Oct. 9, 2015

(65) Prior Publication Data

US 2016/0105836 A1 Apr. 14, 2016

Related U.S. Application Data

(60) Provisional application No. 62/209,837, filed on Aug. 25, 2015, provisional application No. 62/069,677, (Continued)

(51) Int. Cl.
*H04W 72/04* (2009.01)
*H04W 72/12* (2009.01)
(Continued)

(52) U.S. Cl.
CPC ........ *H04W 72/042* (2013.01); *H04B 7/0452* (2013.01); *H04W 72/121* (2013.01);
(Continued)

(58) Field of Classification Search
CPC ............ H04W 36/32; H04W 72/1289; H04W 72/042; H04W 84/12; H04W 88/08; H04W 72/121; H04B 7/0452; H04L 5/0044
See application file for complete search history.

(56) References Cited

U.S. PATENT DOCUMENTS

| 9,113,411 B2* | 8/2015 | Mo ................. H04W 52/0209 |
| 2005/0111449 A1* | 5/2005 | Moorti .................... H04B 1/38 370/389 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Edan Orgad
*Assistant Examiner* — Ivan O Latorre
(74) *Attorney, Agent, or Firm* — McDermott Will & Emery LLP

(57) ABSTRACT

The present invention relates to a method and apparatus for dynamically allocating resources in a High Efficiency WLAN (Wireless Local Area) (HEW). According to one aspect of the present invention, a method for resource switching in a WLAN may be provided. The method may include receiving, by a station (STA) from an access point (AP), a downlink multiple user (DL MU) frame on a resource indicated by first resource allocation information, the DL MU frame including the first resource allocation information and second resource allocation information for a next MU frame following the DL MU frame, and processing, by the STA, the next MU frame based on a resource indicated by the second resource allocation information.

16 Claims, 28 Drawing Sheets

Related U.S. Application Data filed on Oct. 28, 2014, provisional application No. 62/062,745, filed on Oct. 10, 2014.

(51) Int. Cl.
*H04B 7/0452* (2017.01)
*H04W 84/12* (2009.01)
*H04L 5/00* (2006.01)

(52) U.S. Cl.
CPC ....... *H04W 72/1289* (2013.01); *H04L 5/0044* (2013.01); *H04W 84/12* (2013.01)

(56) References Cited

U.S. PATENT DOCUMENTS

| | | | | |
|---|---|---|---|---|
| 2007/0147284 A1* | 6/2007 | Sammour | ............. | H04J 3/0605 370/328 |
| 2008/0096574 A1* | 4/2008 | Khandekar | ......... | H04W 52/265 455/452.2 |
| 2011/0038332 A1* | 2/2011 | Liu | ....................... | H04L 1/1685 370/329 |
| 2011/0287798 A1* | 11/2011 | Ono | ....................... | H04B 7/024 455/509 |
| 2012/0213308 A1* | 8/2012 | Merlin | ................... | H04L 1/1621 375/295 |
| 2015/0023335 A1* | 1/2015 | Vermani | .............. | H04B 7/0452 370/338 |
| 2015/0063190 A1* | 3/2015 | Merlin | ................... | H04L 5/0037 370/312 |
| 2015/0117368 A1* | 4/2015 | Barriac | ................. | H04W 72/02 370/329 |
| 2015/0124690 A1* | 5/2015 | Merlin | ................... | H04L 5/0055 370/312 |
| 2016/0021678 A1* | 1/2016 | Merlin | .............. | H04W 72/1268 370/329 |
| 2016/0066342 A1* | 3/2016 | Ma | .................... | H04W 72/1289 370/329 |
| 2016/0080115 A1* | 3/2016 | Josiam | .................. | H04L 5/0094 370/329 |
| 2016/0143010 A1* | 5/2016 | Kenney | ................. | H04W 4/008 370/330 |
| 2016/0249381 A1* | 8/2016 | Choi | ..................... | H04W 74/06 |
| 2016/0278081 A1* | 9/2016 | Chun | .................... | H04W 74/08 |
| 2016/0374114 A1* | 12/2016 | Lu | ....................... | H04W 72/048 |
| 2017/0048865 A1* | 2/2017 | Choi | ........................ | H04L 5/00 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

\* cited by examiner

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3,STA4) |
| | | | | HE-STF | HE-LTF | HE-SIG-B | HE-LTF | HE-LTF | HE-LTF | HE-SIG-C | PSDU(AP to STA1,STA2) |

FIG. 13

| L-STF | L-LTF | L-SIG | HE-SIG-A | HE-STF | HE-LTF | HE-SIG-B | HE-LTF | HE-LTF | HE-LTF | HE-SIG-C | PSDU(STA4 to AP) |
|||||| HE-STF | HE-LTF | HE-SIG-B | HE-LTF | HE-LTF | HE-LTF | HE-SIG-C | PSDU(STA3 to AP) |
|||||| HE-STF | HE-LTF | HE-SIG-B | HE-LTF | HE-LTF | HE-LTF | HE-SIG-C | PSDU(STA2 to AP) |
|||||| HE-STF | HE-LTF | HE-SIG-B | HE-LTF | HE-LTF | HE-LTF | HE-SIG-C | PSDU(STA1 to AP) |

FIG. 18

| Order | Information |
|---|---|
| 1 | Category |
| 2 | HE Action |
| 3 | Operating Mode fields for DL or UL |

FIG. 19

| Channel Width | Reserved | Operating Mode Type (=0) | RX NSS | RX NSS Type |
|---|---|---|---|---|
| 2 | 1 | 1 | 3 | 1 |

Bits:

FIG. 21

| Element ID | Length | First Channel Number | Number of Channels |
|---|---|---|---|
| 1 | 1 | 1 | 1 |

Octets:

FIG. 22

| B0 | B1 B2 | B3 | B4 | B5 | B6 | B7 | B8 B9 B10 | B11 | B12 | B13 B14 B15 |
|---|---|---|---|---|---|---|---|---|---|---|
| Maximum MPDU Length | Supported Channel Width Set | | Rx LDPC | Short GI for 80 MHz | Short GI for 160 and 80+80 MHz | Tx STBC | Rx STBC | SU Beamformer Capable | SU Beamformee Capable | Beamformee STS Capability |

Bits: 2, 2, 1, 1, 1, 1, 3, 1, 1, 3

| B16 B17 B18 | B19 | B20 | B21 | B22 | B23 B24 B25 | B26 B27 | B28 | B29 | B30 B31 |
|---|---|---|---|---|---|---|---|---|---|
| Number Of Sounding Dimensions | MU Beamformer Capable | MU Beamformee Capable | VHT TXOP PS | +HTC-VHT Capable | Maximum A-MPDU Length Exponent | VHT Link Adaptation Capable | Rx Antenna Pattern Consistency | Tx Antenna Pattern Consistency | Reserved |

| Common Info | | | | Per-User Info | | | | | |
|---|---|---|---|---|---|---|---|---|---|
| UL MU Duration | Total LTFs | LTF Duration | Guard Interval | AID | RU Sub-Channel | RU MCS | RU STS | RU Beam-formed | RU Coding | RU STBC |

DYNAMIC RESOURCE ALLOCATION IN A HIGH EFFICIENCY WIRELESS LAN

CROSS-REFERENCE TO RELATED APPLICATIONS

This application claims the benefits of U.S. Provisional Application No. 62/062,745, filed on Oct. 10, 2014, U.S. Provisional Application No. 62/069,677, filed on Oct. 28, 2014, and U.S. Provisional Application No. 62/209,837, filed on Aug. 25, 2015, which are hereby incorporated by reference as if fully set forth herein.

BACKGROUND OF THE INVENTION

Field of the Invention

The present invention relates to a Wireless Local Area Network (WLAN), and more particularly, to a method, apparatus, and software for dynamically allocating resources in a High Efficiency WLAN (HEW), and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11 ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11 ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for dynamically allocating resources in a HEW.

SUMMARY OF THE INVENTION

Objects of the present invention is to provide a method and apparatus for dynamically allocating resources in a High Efficiency WLAN (HEW).

The objects of the present invention are not limited to the foregoing descriptions, and additional objects will become apparent to those having ordinary skill in the pertinent art to the present invention based upon the following descriptions.

In an aspect of the present invention, a method for resource switching in a WLAN may be provided. The method may include receiving, by a station (STA) from an access point (AP), a downlink multiple user (DL MU) frame on a resource indicated by first resource allocation information, the DL MU frame including the first resource allocation information and second resource allocation information for a next MU frame following the DL MU frame, and processing, by the STA, the next MU frame based on a resource indicated by the second resource allocation information.

In another aspect of the present invention, a method for supporting resource switching in a WLAN may be provided. The method may include transmitting, by an AP to an STA among a plurality of STAs, a DL MU frame on a resource indicated by first resource allocation information, the DL MU frame including the first resource allocation information and second resource allocation information for next MU frame following the DL MU frame, and processing, by the AP, the next MU frame based on a resource indicated by the second resource allocation information.

In another aspect of the present invention, an STA apparatus for resource switching in a WLAN may be provided. The STA apparatus may include a baseband processor, a Radio Frequency (RF) transceiver, a memory, etc. The baseband processor may be configured to receive, from an AP, a DL MU frame on a resource indicated by first resource allocation information using the RF transceiver, the DL MU frame including the first resource allocation information and second resource allocation information for a next MU frame following the DL MU frame, and to process the next MU frame based on a resource indicated by the second resource allocation information.

In another aspect of the present invention, an AP apparatus for supporting resource switching in a WLAN may be provided. The AP apparatus may include a baseband processor, an RF transceiver, a memory, etc. The baseband processor may be configured to transmit to an STA among a plurality of STAs, a DL MU frame on a resource indicated by first resource allocation information using the RF transceiver, the DL MU frame including the first resource allocation information and second resource allocation information for next MU frame following the DL MU frame, and to process the next MU frame based on a resource indicated by the second resource allocation information.

In another aspect of the present invention, a software or computer-readable medium having instructions executable for an STA to perform resource switching in a WLAN may be provided. The executable instructions may cause the STA to receive, from an AP, a DL MU frame on a resource indicated by first resource allocation information, the DL MU frame including the first resource allocation information and second resource allocation information for a next MU frame following the DL MU frame, and to process the next MU frame based on a resource indicated by the second resource allocation information.

In another aspect of the present invention, a software or computer-readable medium having instructions executable for an AP to support resource switching in a WLAN may be provided. The executable instructions may cause the AP to transmit to an STA among a plurality of STAs, a DL MU frame on a resource indicated by first resource allocation information, the DL MU frame including the first resource allocation information and second resource allocation information for next MU frame following the DL MU frame, and to process the next MU frame based on a resource indicated by the second resource allocation information.

It is to be understood that both the foregoing summarized features are exemplary aspects of the following detailed description of the present invention without limiting the scope of the present invention.

According to the present invention, a method and apparatus for dynamically allocating resources in a HEW can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 depicts the starting and ending points of an High Efficiency Long Training Field (HE-LTF) field in a HE PPDU frame format according to the present invention;

FIG. 12 depicts a High Efficiency SIGnal B (HE-SIG-B) field and a High Efficiency SIGnal C (HE-SIG-C) field in the HE PPDU frame format according to the present invention;

FIG. 13 depicts another example of a HE PPDU frame format according to the present invention;

FIGS. 18, 19, and 20 depict a format of an Operating Mode Notification frame and a format of an Operating Mode Notification element according to the present invention;

FIG. 21 depicts a format of a Supported Channel element according to the present invention;

FIG. 22 depicts a format of a Supported Channel Width Set field according to the present invention;

FIG. 24 depicts application of a transmission spectrum mask according to the present invention;

FIG. 25 depicts an exemplary format of a trigger frame;

DETAILED DESCRIPTION OF THE INVENTION

Figure 1:
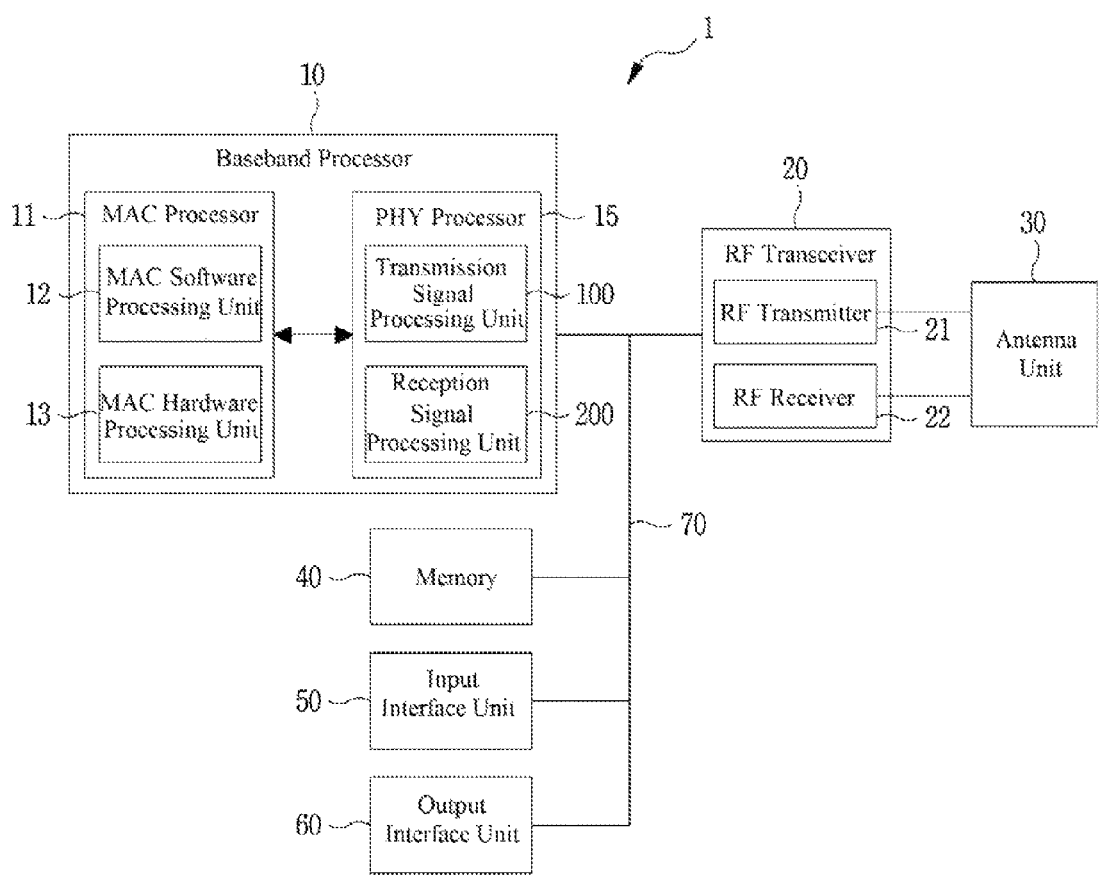
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer in conformance to Institute of Electrical and Electronics Engineers (IEEE) 802.11 series standards. At least one of the WLAN devices may be an Access Point (AP) and the other WLAN devices may be non-AP Stations (non-AP STAs). Alternatively, all of the WLAN devices may be non-AP STAs in an ad-hoc network. Generally, the term STA covers AP STA and non-AP STA. However, only a non-AP STA may be referred to as a STA, for the convenience's sake.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmission signal processing unit 100 and a reception signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
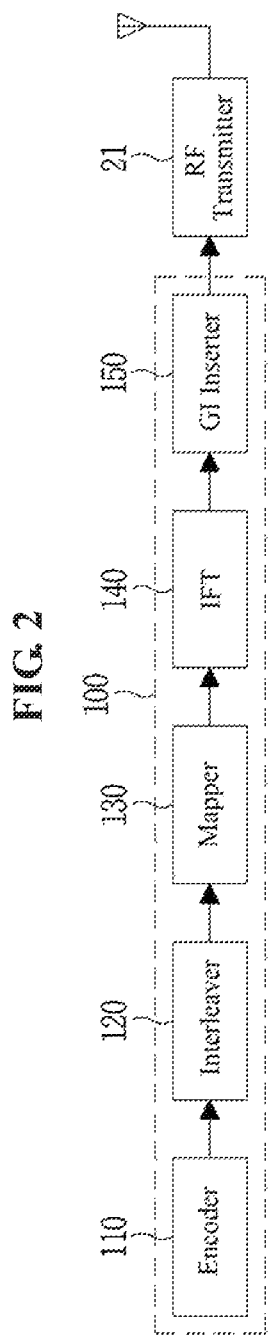
FIG. 2 is a schematic block diagram of an exemplary transmission signal processing unit in a WLAN.

FIG. 2 is a schematic block diagram of an exemplary transmission signal processor in a WLAN.

Referring to FIG. 2, the transmission signal processing unit 100 includes an encoder 110, an interleaver 120, a mapper 130, an Inverse Fourier Transform (IFT) processor 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmission signal processing unit 100 may further include a scrambler for scrambling input data before encoding to reduce the probability of long sequences of 0s or 1s. If a BCC encoding scheme is used in the encoder 110, the transmission signal processing unit 100 may further include an encoder parser for demultiplexing the scrambled bits among a plurality of BCC encoders. If an LDPC encoding scheme is used in the encoder 110, the transmission signal processing unit 100 may not use the encoder parser.

The interleaver 120 interleaves the bits of each stream output from the encoder 110 to change orders of bits. Interleaving may be applied only when a BCC encoding scheme is used in the encoder 110. The mapper 130 maps a sequence of bits output from the interleaver 120 to constellation points. If an LDPC encoding scheme is used in the encoder 110, the mapper 130 may further perform LDPC tone mapping besides the constellation point mapping.

In MIMO or MU-MIMO, the transmission signal processing unit 100 may use as many interleavers 120 as and as many mappers 130 as the number $N_{SS}$ of spatial streams. In this case, the transmission signal processing unit 100 may further include a stream parser for dividing the outputs of the BCC encoders or the output of the LDPC encoder into a plurality of blocks to be provided to the different interleavers 120 or mappers 130. The transmission signal processing unit 100 may further include a Space-Time Block Code (STBC) encoder for spreading the constellation points from $N_{SS}$ spatial streams into $N_{STS}$ space-time streams and a spatial mapper for mapping the space-time streams to transmit chains. The spatial mapper may use direct mapping, spatial expansion, or beamforming.

The IFT processor 140 converts a block of constellation points output from the mapper 130 or the spatial mapper to a time-domain block (i.e., a symbol) by Inverse Discrete Fourier Transform (IDFT) or Inverse Fast Fourier Transform (IFFT). If the STBC encoder and the spatial mapper are used, the IFT processor 140 may be provided for each transmit chain.

In MIMO or MU-MIMO, the transmission signal processing unit 100 may insert Cyclic Shift Diversities (CSDs) in order to prevent unintended beamforming. A CSD insertion may applied before or after IFT. A CSD may be specified for each transmit chain or for each space-time stream. Alternatively, the CSD may be applied as a part of the spatial mapper.

In MU-MIMO, some blocks before the spatial mapper may be provided for each user.

The GI inserter 150 prepends a GI to a symbol. The transmission signal processing unit 100 may optionally perform windowing to smooth edges of each symbol after inserting the GI. The RF transmitter 21 converts the symbols into an RF signal and transmits the RF signal via the antenna unit 30. In MIMO or MU-MIMO, the GI inserter 150 and the RF transmitter 21 may be provided for each transmit chain.

Figure 3:
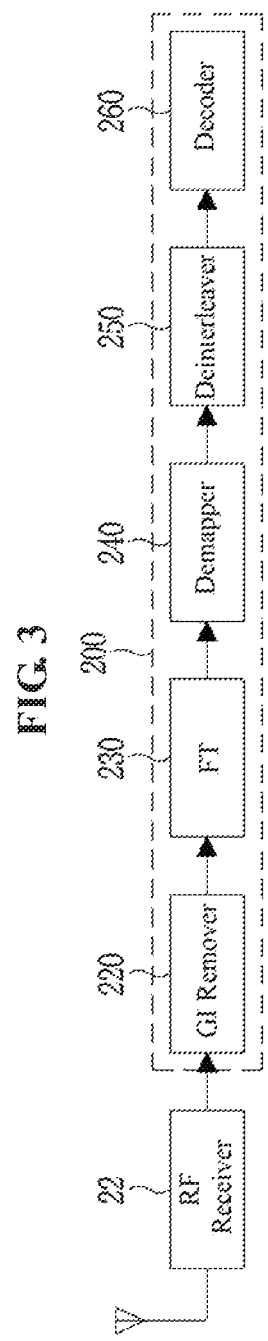
FIG. 3 is a schematic block diagram of an exemplary reception signal processing unit in a WLAN.

FIG. 3 is a schematic block diagram of an exemplary a reception signal processor in a WLAN.

Referring to FIG. 3, the reception signal processing unit 200 includes a GI remover 220, a Fourier Transform (FT) processor 230, a demapper 240, a deinterleaver 250, and a decoder 260.

The RF receiver 22 receives an RF signal via the antenna unit 30 and converts the RF signal into symbols. The GI remover 220 removes a GI from the symbols. In MIMO or MU-MIMO, the RF receiver 22 and the GI remover 220 may be provided for each receive chain.

The FT 230 converts the symbol (i.e., the time-domain block) into a block of constellation points by Discrete Fourier Transform (DFT) or Fast Fourier Transform (FFT). The FT processor 230 may be provided for each receive chain.

In MIMO or MU-MIMO, the reception signal processing unit 200 may include a spatial demapper for converting Fourier Transformed receiver chains to constellation points of space-time streams, and an STBC decoder for despreading the constellation points from the space-time streams into the spatial streams.

The demapper 240 demaps constellation points output from the FT processor 230 or the STBC decoder to bit streams. If an LDPC encoding scheme has been applied to the received signal, the demapper 240 may further perform LDPC tone demapping before the constellation demapping. The deinterleaver 250 deinterleaves the bits of each of the streams output from the demapper 240. Deinterleaving may be applied only when a BCC encoding scheme has been applied to the received signal.

In MIMO or MU-MIMO, the reception signal processing unit 200 may use as many demappers 240 as and as many deinterleavers 250 as the number of spatial streams. In this case, the reception signal processing unit 200 may further include a stream deparser for combining streams output from the deinterleavers 250.

The decoder 260 decodes streams output from the deinterleaver 250 or the stream deparser. For example, the decoder 100 may be an FEC decoder. The FEC decoder may include a BCC decoder or an LDPC decoder. The reception signal processing unit 200 may further include a descrambler for descrambling the decoded data. If a BCC decoding scheme is used in the decoder 260, the reception signal processing unit 200 may further include an encoder deparser for multiplexing data decoded by a plurality of BCC decoders. If an LDPC decoding scheme is used in the decoder 260, the reception signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
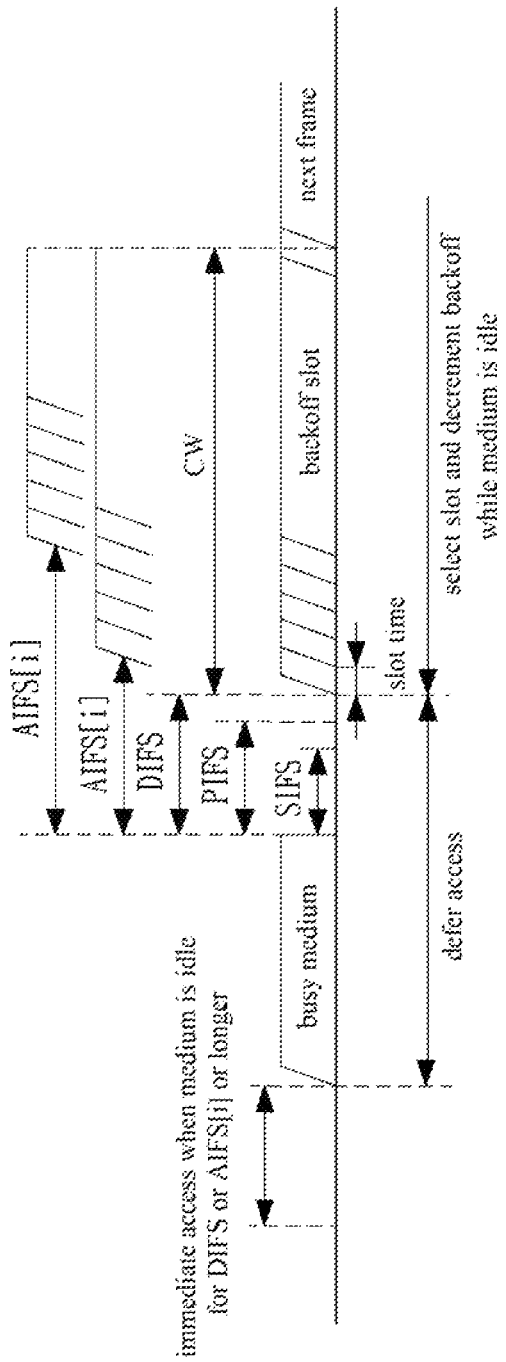
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data to be forwarded to a higher layer. After a Distributed Coordination Function IFS (DIFS) from a time when a medium gets idle, a WLAN device performs a backoff and then transmits a data frame. A management frame is used for exchanging management information which is not forwarded to the higher layer. After an IFS such as the DIFS or a Point Coordination Function IFS (PIFS), the WLAN device transmits the management frame. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. If the control frame is not a response frame to another frame, the WLAN device performs a backoff after the DIFS and then transmits the control frame; or if the control frame is a response frame to another frame, the WLAN device transmits the control frame after a Short IFS (SIFS) without a backoff. The type and subtype of a frame may be identified by a type field and a subtype field in a Frame Control (FC) field.

On the other hand, a Quality of Service (QoS) STA may perform a backoff after an Arbitration IFS (AIFS) for Access Category (AC), i.e., AIFS[i] (i is determined based on AC) and then transmit a frame. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
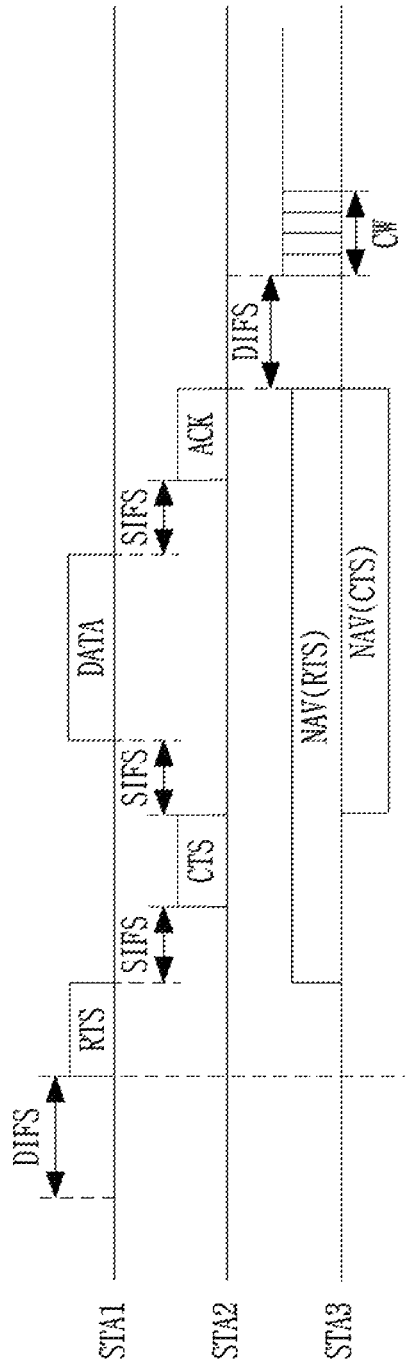
FIG. 5 is a conceptual diagram illustrating a procedure for transmitting a frame in Carrier Sense Multiple Access with Collision Avoidance (CSMA/CA) to avoid collision between frames on a channel.

FIG. 5 is a conceptual diagram illustrating a CSMA/CA-based frame transmission procedure to avoid collision between frames on a channel.

Referring FIG. 5, a first STA (STA1) is a transmitting WLAN device having data to be transmitted, a second STA (STA2) is a receiving WLAN device to receive the data from STA1, and a third STA (STA3) is a WLAN device located in an area where STA3 may receive a frame from STA1 and/or STA2.

STA1 may determine whether a channel is busy by carrier sensing. STA1 may determine channel occupancy based on an energy level of the channel or a correlation between signals on the channel, or using a Network Allocation Vector (NAV) timer.

If STA1 determines that the channel is not used by other devices during a DIFS (that is, the channel is idle), STA1 may transmit an RTS frame to STA2 after performing a backoff. Upon receipt of the RTS frame, STA2 may transmit a CTS frame as a response to the CTS frame after a SIFS.

Upon receipt of the RTS frame, STA3 may set a NAV timer for a transmission duration of following frames (e.g., a SIFS time+a CTS frame duration+a SIFS time+a data frame duration+a SIFS time+an ACK frame duration), based on duration information included in the RTS frame. Upon receipt of the CTS frame, STA3 may set the NAV timer for a transmission duration of following frames (e.g., a SIFS time+a data frame duration+a SIFS time+an ACK frame duration), based on duration information included in the CTS frame. Upon receipt of a new frame before the NAV timer expires, STA3 may update the NAV timer based on duration information included in the new frame. STA3 does not attempt to access the channel until the NAV timer expires.

Upon receipt of the CTS frame from STA2, STA1 may transmit a data frame to STA2 a SIFS after the CTS frame has been completely received. Upon successful receipt of the data frame from STA1, STA2 may transmit an ACK frame as a response to the data frame after a SIFS.

Upon expiration of the NAV timer, STA3 may determine whether the channel is busy by carrier sensing. If STA3 determines that the channel is not in use by the other devices during a DIFS after expiration of the NAV timer, STA3 may attempt channel access after a convention window according a random backoff-based CW.

Figure 6:
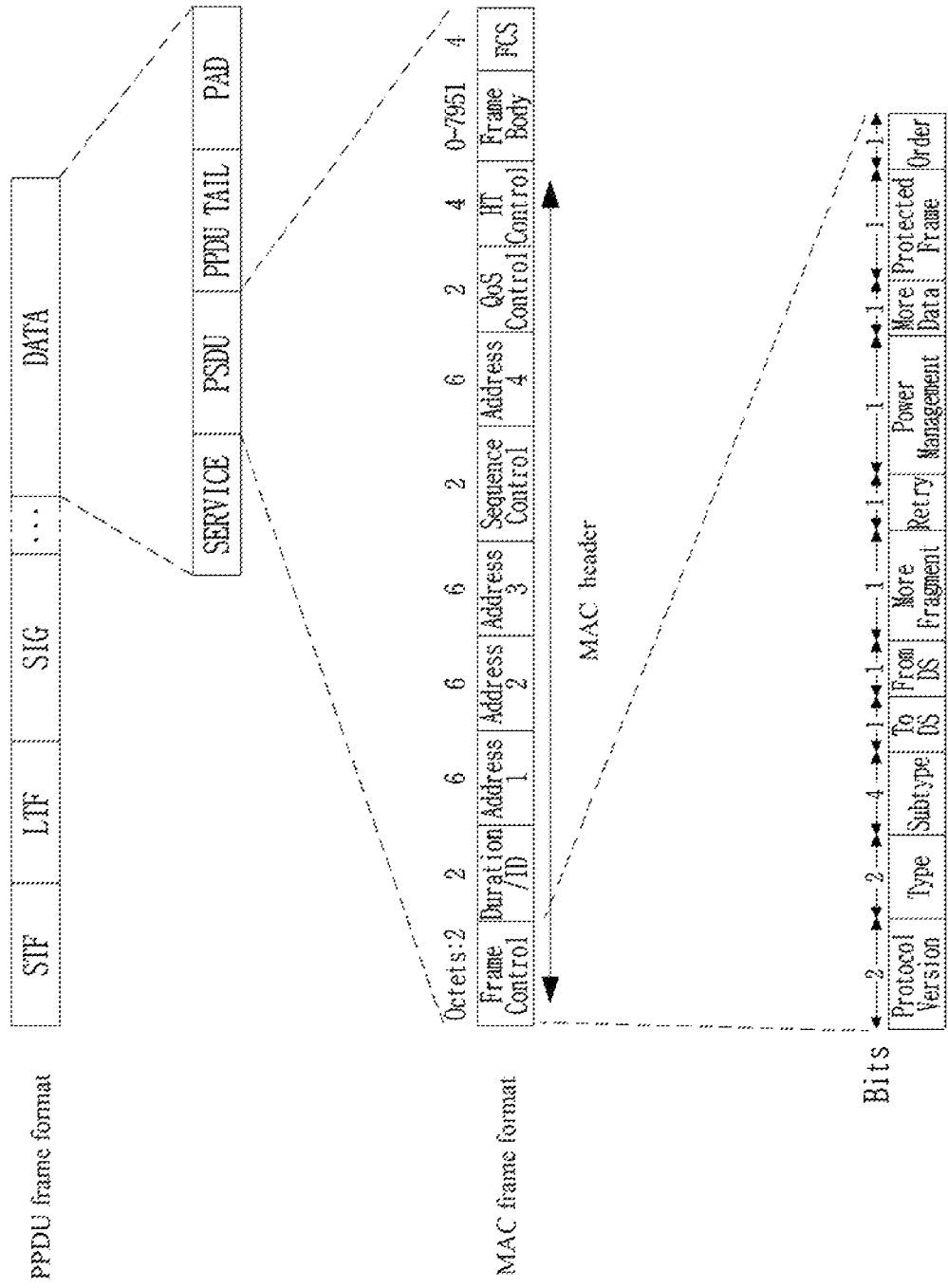
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11 ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
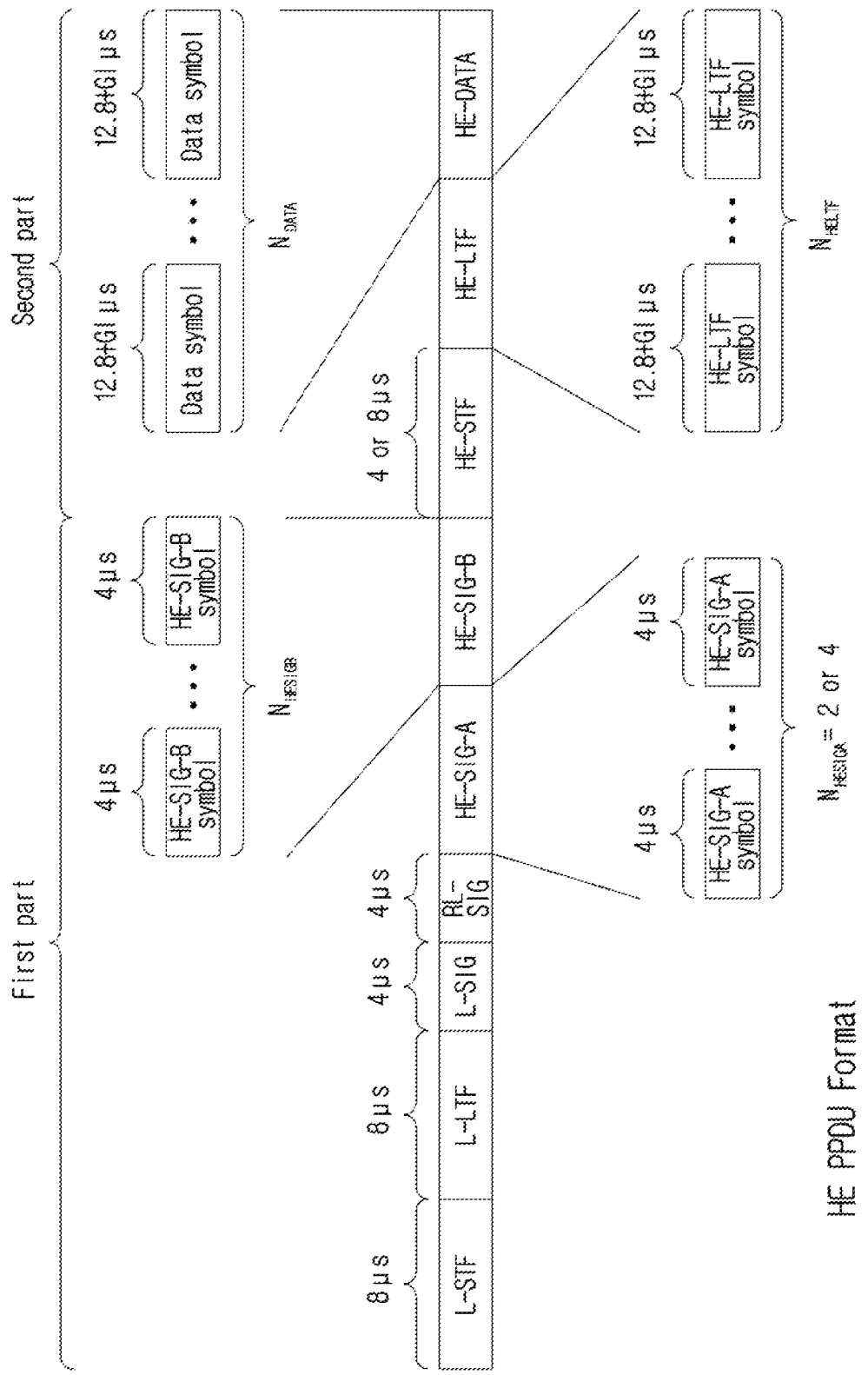
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may detect a PPDU and then process the PPDU.

The HE PPDU frame format may broadly include two parts: the first part including an L-STF field, an L-LTF field, an L-SIG field, an RL-SIG field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table 1.

TABLE 1

| Element | definition | duration | DFT period | GI | Subcarrier spacing | Description |
|---|---|---|---|---|---|---|
| Legacy(L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |

TABLE 1-continued

| Element | definition | duration | DFT period | GI | Subcarrier spacing | Description |
|---|---|---|---|---|---|---|
| HE-SIG-B | HE SIGNAL B field | $N_{HESIGB} * 4$ μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF} *$ (DTF period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols is equal to 1, 2, 4 6, 8. |
| HE-DATA | HE DATA field | $N_{DATA} *$ (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is a HE SIGNAL A field and may have a duration of $N_{HESIGA}*4$ μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}*4$, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}*$(DFT period+GI)μs. $N_{HELTF}$ represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4xLTF mode, a HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2xLTF may have a DFT period of 6.4 μs and 4xLTF may have a DFT period of 12.8 μs. A GI of HE-LTF may support 0.8 μs, 1.6 μs, and 3.2 μs 2xLTF may have a subcarrier spacing equivalent to 156.25 kHz and 4xLTF may have a subcarrier spacing of 78.125 kHz.

HE-DATA is a HE DATA field and may have a duration of, $N_{DATA}*$(DFT period+GI)μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
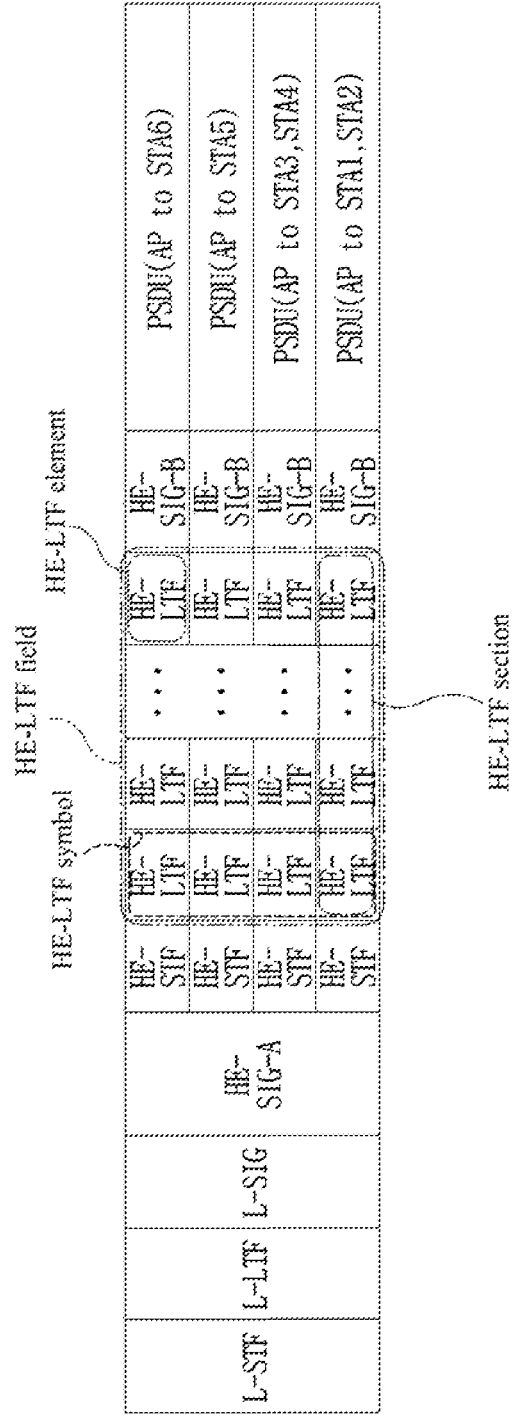
FIG. 8 depicts an exemplary High Efficiency (HE) Physical layer Protocol Data Unit (PPDU) frame format according to the present invention.

FIG. 8 depicts an exemplary HE PPDU frame format according to the present invention.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11 ac stations, as listed in [Table 2] below, to ensure backward compatibility with legacy STAs (e.g., IEEE 802.11ac stations).

TABLE 2

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \le p \le 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream |

TABLE 2-continued

| Two parts of VHT-SIG-A | Bit | Field | Number of bits | Description |
|---|---|---|---|---|
| | | | | Set to 2 for 2 space-time streams |
| | | | | Set to 3 for 3 space-time streams |
| | | | | Set to 4 for 4 space-time streams |
| | | | | Values 5-7 are reserved |
| | | | | For a VHT SU PPDU: |
| | | | | B10-B12 |
| | | | | Set to 0 for 1 space-time stream |
| | | | | Set to 1 for 2 space-time streams |
| | | | | Set to 2 for 3 space-time streams |
| | | | | Set to 3 for 4 space-time streams |
| | | | | Set to 4 for 5 space-time streams |
| | | | | Set to 5 for 6 space-time streams |
| | | | | Set to 6 for 7 space-time streams |
| | | | | Set to 7 for 8 space-time streams |
| | | | | B13-B21 |
| | | | | Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 2] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11 ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 9:
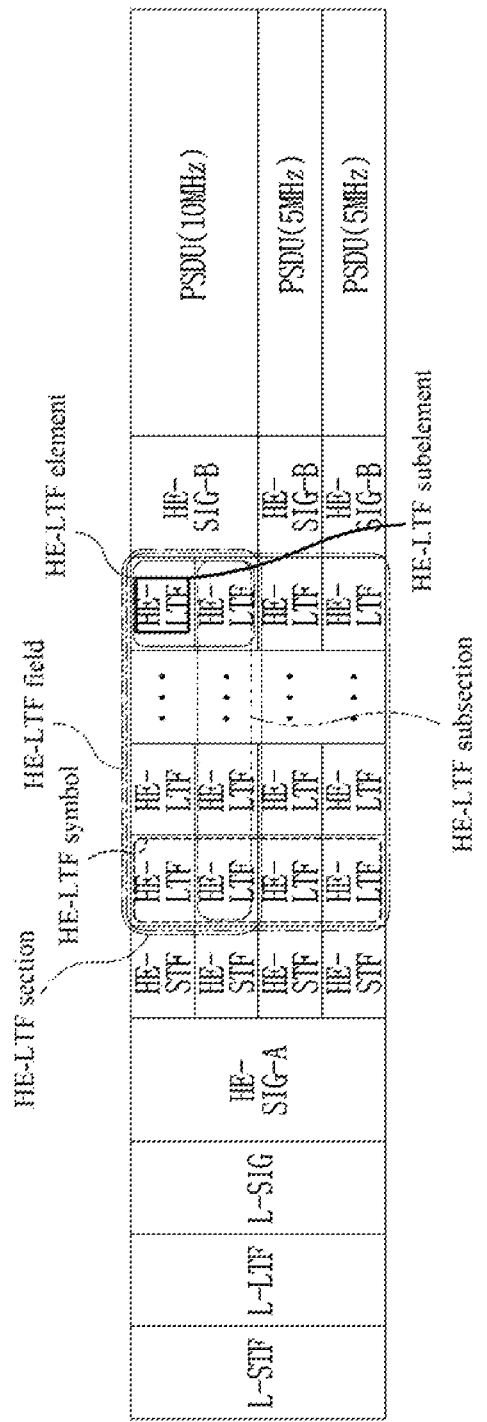
FIG. 9 depicts subchannel allocation in a HE PPDU frame format according to the present invention.

FIG. 9 depicts subchannel allocation in the HE PPDU frame format according to the present invention.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present invention does not exclude non-allocation of an intermediate subchannel of one channel to a STA.

Figure 10:
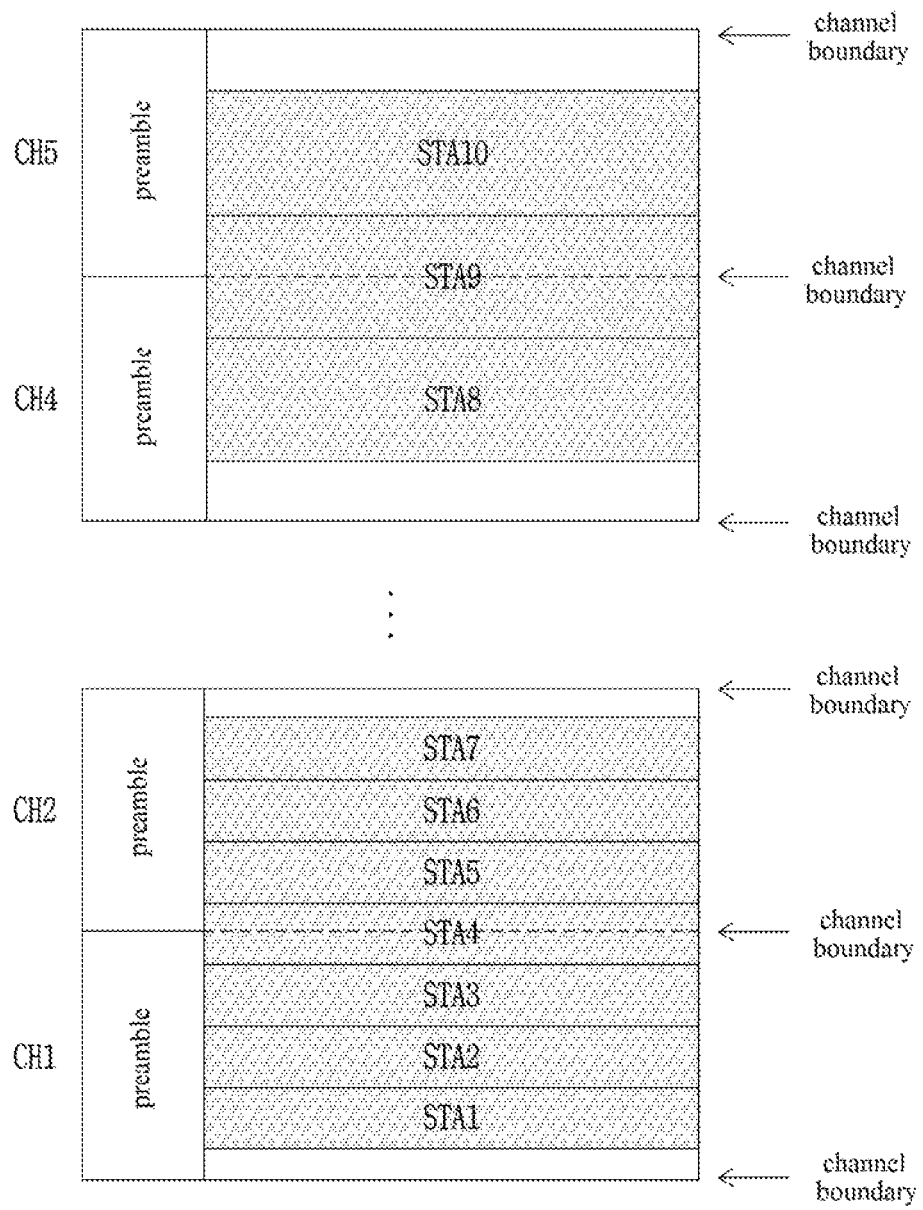
FIG. 10 depicts a subchannel allocation method according to the present invention.

FIG. 10 depicts a subchannel allocation method according to the present invention.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels).

In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, relationship between a total number of spatial streams transmitted on one subchannel and a number of HE-LTFs is listed in [Table 3].

TABLE 3

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 11 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 12 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 13 may be used for a UL HE PPDU transmission.

FIG. 13 depicts another exemplary HE PPDU frame format according to the present invention. The HE PPDU frame format illustrated in FIG. 13 is characterized in that a structure of HE-SIG-A, HE-SIG-B, and HE-SIG-C fields similar to in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 13 may not exist. In this case, a description of each field given below may be applied only in the presence of the field.

In the example of FIG. 13, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 14:
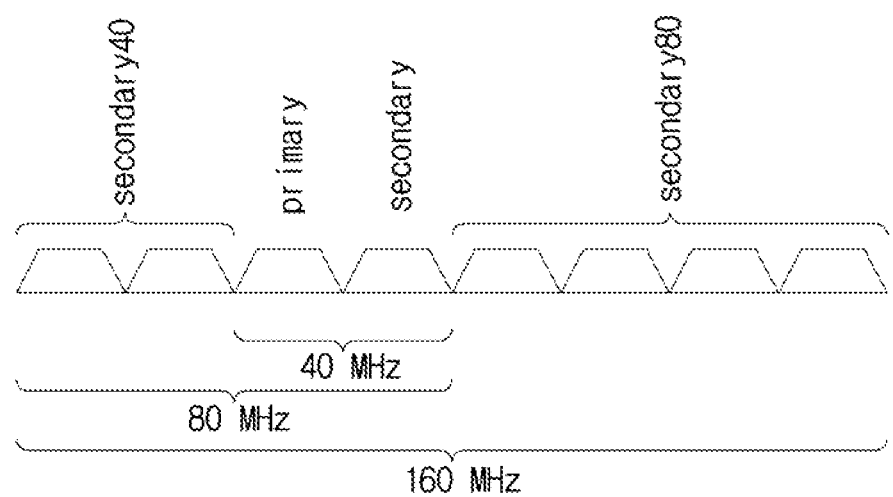
FIGS. 14 and 15 depict operating channels in a WLAN system.
Figure 15:
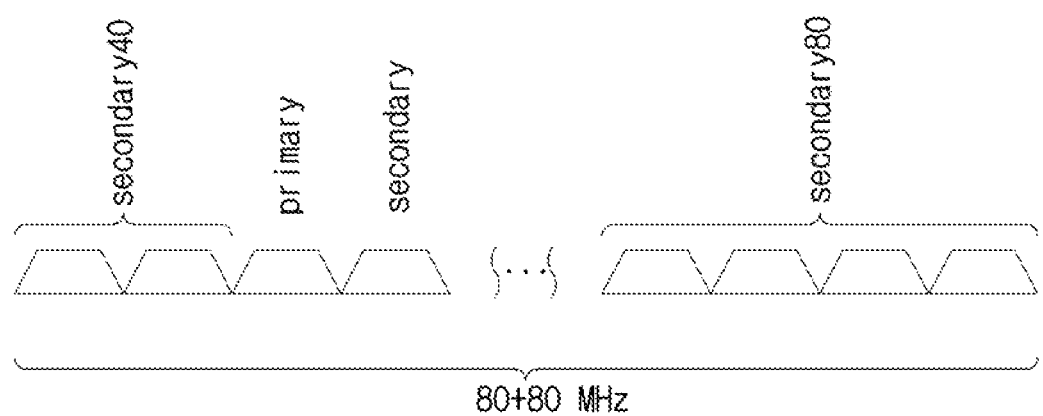

FIGS. 14 and 15 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 14). Further, the WLAN system may support a BSS operating channel having a bandwidth of 160 MHz including non-contiguous 80-MHz channels (called a bandwidth of 80+80 MHz) (refer to FIG. 15).

As illustrated in FIG. 14, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 15, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If an STA uses a channel width larger than the channel width of the primary channel, for data transmission, the STA may use another channel within a corresponding channel, in addition to the primary channel. This additional channel is referred to as a secondary channel.

Figure 16:
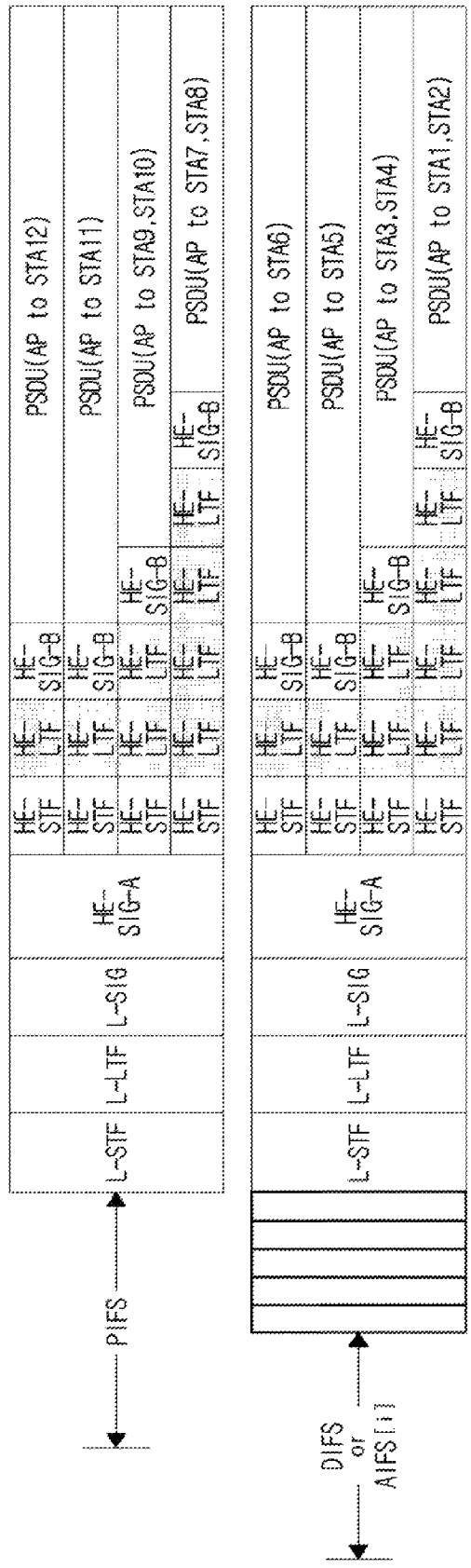
FIG. 16 depicts transmission of a HE PPDU frame on a plurality of channels according to the present invention.

FIG. 16 depicts transmission of a HE PPDU frame on a plurality of channels according to the present invention.

While FIG. 16 illustrates an exemplary case in which PSDUs are transmitted at different transmission timings on subchannels of each of a plurality of channels (i.e., the lengths of HE-LTF sections are different on the subchannels) in a DL HE PPDU format, a HE PPDU format in which PSDUs are transmitted at the same transmission timing on subchannels (i.e., the lengths of HE-LTF sections are the same on the subchannels), or a UL HE PPDU format may be applied as illustrated in FIGS. 11, 12, and 13.

Further, FIG. 16 illustrates a channel access operation in Enhanced Distributed Channel Access (EDCA), when a DL or UL HE PPDU is transmitted on a plurality of channels.

The example of FIG. 16 is based on the assumption that a low-frequency channel is a primary channel and a high-frequency channel is a secondary channel among a plurality of channels.

Upon generation of a transmission frame, an STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

Figure 17:
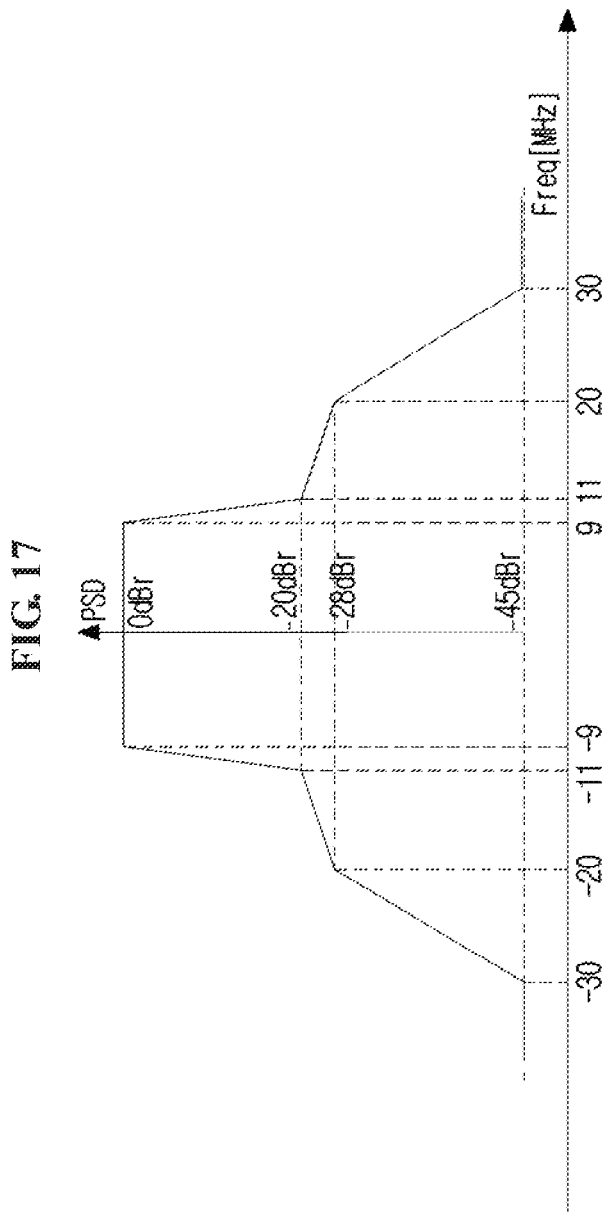
FIG. 17 depicts an exemplary transmission spectrum mask for 20-MHz transmission in a 2.4-GHz band.

Further, as illustrated in the example of FIG. 17, a transmission spectrum mask for 20-MHz transmission in a 2.4-GHz band may be given. In this case, if a 20-MHz mask PPDU can be transmitted, this means that a PPDU having a PSD equal to or smaller than that of the spectrum mask of FIG. 17, that is, a PPDU having a channel width of 20 MHz or a PPDU having a channel width below 20 MHz (e.g., a subchannel) can be transmitted.

As described before, if a HE STA is allowed to start a TXOP and has at least one MAC Service Data Unit (MSDU) to be transmitted under the Access Category (AC) of the TXOP allowed for the HE STA, the HE STA may perform one of the following a), b), c), d), or e) (in the following description, FIGS. 14 and 15 may be referred to for a primary channel (i.e., a primary 20-MHz channel) a secondary channel (i.e., a secondary 20-MHz channel), a secondary 40-MHz channel, and a secondary 80-MHz channel).

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

Figure 20:
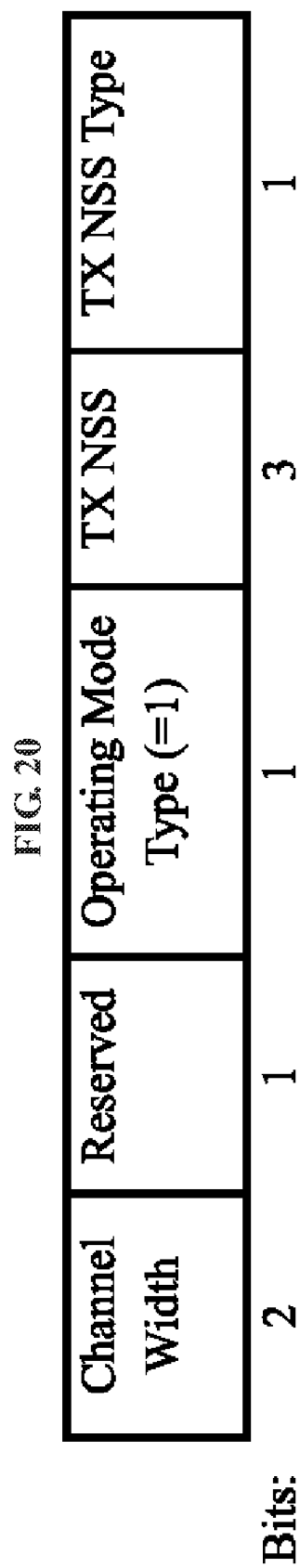

FIGS. 18, 19, and 20 depict a format of an Operating Mode Notification frame and a format of an Operating Mode Notification element according to the present invention.

An STA (an AP or a non-AP STA) may change its operating channel width at any time point. For this purpose, an Operating Mode Notification element or an Operating Mode Notification frame may be used. That is, the STA may indicate its operating mode by transmitting an Operating Mode Notification element or an Operating Mode Notification frame.

An Operating Mode Notification element (or field) for UL transmission may be transmitted to an AP, for example, in an Association Request frame, a Probe Request frame, or an Operating Mode Notification frame.

In the case where the AP indicates its operating mode to the STA, the AP may transmit an Operating Mode Notification element (or field) for DL transmission to the STA in an Association Response frame, a Probe Response frame, or an Operating Mode Notification frame.

An Operating Mode fields for DL or UL element (or field) may be included in the header (e.g., HT Control field, VHT Control field, or HE Control field) of a MAC data frame.

If the Operating Mode fields for DL or UL element (or field) is included in the header of a MAC data frame, the ACK Policy field of the MAC data frame should be set to a value indicating ACK Request. If an ACK is not received in response to the MAC data frame including the Operating Mode fields for DL or UL element (or field), a change in an operating mode for DL or UL transmission may be considered as invalid.

FIG. 18 illustrates an exemplary format of an Operating Mode Notification frame.

In the example of FIG. 18, a Category field may indicate that this frame is a HE action frame, and a HE Action field may indicate that this frame is an Operating Mode Notification frame.

In the example of FIG. 18, an Operating Mode fields for DL or UL field may be configured in the format illustrated in FIG. 19 or FIG. 20. The Operating Mode fields for DL or UL field may correspond to an Operating Mode fields for DL or UL element.

As illustrated in the example of FIG. 19, the Operating Mode fields for DL or UL field may include subfields that provide information applied to a DL HE PPDU. For example, the Operating Mode fields for DL or UL field may include a 2-bit Channel Width subfield, a 1-bit reserved subfield, a 1-bit Operating Mode Type subfield, a 3-bit Rx Nss subfield, and a 1-bit Rx Nss Type subfield.

The Operating Mode Type subfield may be set to a value indicating application to a DL HE PPDU (e.g., 0). In this case, the Channel Width, Rx Nss, and Rx Nss Type subfields may be defined as illustrated in [Table 4] below.

TABLE 4

| Subfield | Description |
| --- | --- |
| Channel Width | If the Rx NSS Type subfield is 0, indicates the supported channel width that the STA can receive:<br>Set to 0 for 20 MHz<br>Set to 1 for 40 MHz<br>Set to 2 for 80 MHz<br>Set to 3 for 160 MHz or 80 + 80 MHz<br>Reserved if the Rx NSS Type subfield is 1. |
| Rx NSS | If the Rx NSS Type subfield is 0, indicates the maximum number of spatial streams that the STA can receive.<br>If the Rx NSS Type subfield is 1, indicates the maximum number of spatial streams that the STA can receive as a beamformee in an SU PPDU using a beamforming steering matrix derived from a VHT Compressed Beamforming report or an HE Compressed Beamforming report with Feedback Type subfield indicating MU in the corresponding VHT Compressed Beamforming frame or an HE Compressed Beamforming frame sent by the STA.<br>Set to 0 for NSS = 1<br>Set to 1 for NSS = 2<br>. . .<br>Set to 7 for NSS = 8 |
| Rx NSS Type | Set to 0 to indicate that the Rx NSS subfield carries the maximum number of spatial streams that the STA can receive.<br>Set to 1 to indicate that the Rx NSS subfield carries the maximum number of spatial streams<br>that the STA can receive in an SU PPDU using a beamforming steering matrix derived from<br>a VHT Compressed Beamforming report with the Feedback Type subfield indicating MU in |

TABLE 4-continued

| Subfield | Description |
| --- | --- |
| | the corresponding VHT Compressed Beamforming frame sent by the STA. An AP always sets this field to 0. |

Referring to [Table 4], the Channel Width subfield indicates a supported channel width that an STA may receive, if the Rx Nss Type subfield is 0. If the Channel Width subfield is set to 0, 1, 2, or 3, it may indicate 20 MHz, 40 MHz, 80 MHz, or 160 MHz or 80+80 MHz, respectively. If the Rx Nss Type subfield is 1, the Channel Width subfield may be reserved.

The Rx Nss subfield may indicate the maximum number of Spatial Streams (SSs) that the STA may receive, if the Rx Nss Type subfield is 0. If the Rx Nss Type subfield is 1, the Rx Nss subfield may indicate the maximum number of SSs that the STA may receive as an SU PPDU beamformee (i.e., a beamformed signal receiver) using a beamforming steering matrix induced from a VHT compressed beamforming report or a HE compressed beamforming report. The VHT compressed beamforming report or the HE compressed beamforming report may be included in a VHT compressed beamforming frame or a HE compressed beamforming frame, and a Feedback Type subfield included in the frame may indicate MU. If the Rx Nss subfield is set to 0, 1, 2, 3, 4, 5, 6, or 7, it may indicate 1, 2, 3, 4, 5, 6, 7, or 8 SSs, respectively.

If the Rx Nss Type subfield is 0, the Rx Nss subfield may indicate the maximum number of SSs that the STA may receive. If the Rx Nss Type subfield is 1, the Rx Nss subfield may indicate the maximum number of SSs that the STA may receive in an SU PPDU using a beamforming steering matrix induced from the VHT compressed beamforming report or the HE compressed beamforming report. The VHT compressed beamforming report or the HE compressed beamforming report may be included in a VHT compressed beamforming frame or a HE compressed beamforming frame, and the Feedback Type subfield included in the frame may indicate MU. The AP may always set the Rx Nss Type subfield to 0.

On the other hand, the Operating Mode Type subfield may be set to a value (e.g., 1) indicating application to a UL HE PPDU. In this case, the Channel Width, Tx NSS, and TX NSS Type subfields may be defined as illustrated in [Table 5] below.

TABLE 5

| Subfield | Description |
| --- | --- |
| Channel Width | If the Tx NSS Type subfield is 0, indicates the supported channel width that the STA can transmit in UL Multi-User (MU) PPDU (e.g., uplink OFDMA or uplink MU-MIMO): Set to 0 for 20 MHz Set to 1 for 40 MHz Set to 2 for 80 MHz Set to 3 for 160 MHz or 80 + 80 MHz Reserved if the Tx NSS Type subfield is 1. |
| Tx NSS | If the Tx NSS Type subfield is 0, indicates the maximum number of spatial streams that the STA can transmit in UL Multi-User (MU) PPDU (e.g., uplink OFDMA or uplink MU-MIMO). Set to 0 for NSS = 1 Set to 1 for NSS = 2 |

TABLE 5-continued

| Subfield | Description |
| --- | --- |
| | ... Set to 7 for NSS = 8 Reserved if the Tx NSS Type subfield is 1. |
| Tx NSS Type | Set to 0 to indicate that the Tx NSS subfield carries the maximum number of spatial streams that the STA can transmit in UL Multi-User (MU) PPDU (e.g., uplink OFDMA or uplink MU-MIMO). Set to 1 to indicate that the STA does not enable UL Multi-User (MU) PPDU (e.g., uplink OFDMA or uplink MU-MIMO) transmission. |

Referring to [Table 5], the Channel Width subfield indicates a supported channel width that an STA may transmit in a UL MU PPDU (e.g., a UL OFDMA PPDU or a UL MU-MIMO PPDU), if the Tx Nss Type subfield is 0. If the Channel Width subfield is set to 0, 1, 2, or 3, it may indicate 20 MHz, 40 MHz, 80 MHz, or 160 MHz or 80+80 MHz, respectively. If the Tx Nss Type subfield is 1, the Channel Width subfield may be reserved.

The Tx Nss subfield may indicate the maximum number of SSs that the STA may transmit in the UL MU PPDU (e.g., the UL OFDMA PPDU or the UL MU-MIMO PPDU), if the Tx Nss Type subfield is 0. If the Tx Nss subfield is set to 0, 1, 2, 3, 4, 5, 6, or 7, it may indicate 1, 2, 3, 4, 5, 6, 7, or 8 SSs, respectively. If the Tx Nss Type subfield is set to 1, the Tx Nss subfield may be reserved.

If the Tx Nss Type subfield is 0, the Tx Nss subfield may indicate the maximum number of SSs that the STA may transmit in the UL MU PPDU (e.g., the UL OFDMA PPDU or the UL MU-MIMO PPDU). If the Tx Nss Type subfield is 1, the Tx Nss subfield may indicate that the STA does not enable transmission of the UL MU PPDU (e.g., the UL OFDMA PPDU or the UL MU-MIMO PPDU).

In addition to the examples of FIGS. 19 and 20, the Operating Mode fields for DL or UL field may be defined for each of the DL and the UL. In this case, the DL Channel Width and Rx NSS fields may be set to the same values as the UL Channel Width and Tx NSS fields.

For example, if the DL Channel Width is set to 40 MHz in the Operating Mode field (e.g., a channel width receivable at an STA is 40 MHz), this may mean that the UL Channel Width is 40 MHz (e.g., a maximum channel width that an AP may request to the STA, for UL MU PPDU transmission is 40 MHz).

If a DL Rx NSS value is 2 in the Operating Mode field (i.e., the maximum number of SSs receivable at the STA is 2), this may mean that a UL Tx NSS value is 2 (i.e., the maximum number of SSs that the AP may request to the STA, for UL MU PPDU transmission is 2).

As described above, an STA may enable or disable UL MU PPDU transmission dynamically and change the maximum number of receivable/transmittable SSs dynamically, by the Operating Mode Notification element or the Operating Mode Notification frame. In general, the STA may dynamically determine these parameters in consideration of the amount of traffic to be transmitted, an energy consumption, etc.

FIG. 21 depicts a format of a Supported Channel element according to the present invention.

An STA (an AP or a non-AP STA) may transmit its supported channel list by a Supported Channel element. A Supported Channel element transmitted by a non-AP STA may be included in an Association Request frame or a Reassociation Request frame. A Supported Channel element transmitted by an AP may be included in an Association Response frame or a Reassociation Response frame.

In the format of the Supported Channel element illustrated in FIG. 21, an Element ID field may be set to a value indicating that this element is a Supported Channel element.

A Length field may be set to a value determined according to the number of First Channel Number and Number of Channels field pairs.

The First Channel Number field may be set to a value indicating the first of supported channels.

The Number of Channels field may be set to a value indicating the number of supported channels.

If the channels supported by the STA are contiguous, the contiguous channels may form one band. On the other hand, if the channels supported by the STA are not contiguous, the non-contiguous channels may form a plurality of bands (each band including contiguous channels). Each band corresponds to a pair (or tuple) of one First Channel Number field and one Number of Channels field. For a band including contiguous channels, channel 1 to channel 11, the (First Channel Number, Number of Channels) value may be set to (1, 11).

FIG. 22 depicts a format of a Supported Channel Width Set field according to the present invention.

The Supported Channel Width Set field may be included as one field of a Capability element format as illustrated in FIG. 22. FIG. 22 illustrates a VHT Capability element, by way of example. One or more of the fields included in the VHT Capability element or an additional field may be included in a HE Capability element. For details of the other fields illustrated in FIG. 22, refer to the IEEE 802.11 ac-2013 specification.

An STA (an AP or a non-AP STA) may indicate its supported channel width set by a Capability element. A Capability element transmitted by a non-AP STA may be included in an Association Request frame or a Reassociation Request frame. A Capability element transmitted by an AP may be included in an Association Response frame or a Reassociation Response frame.

If the STA does not support either of 160 MHz and 80+80 MHz, the Supported Channel Width Set field may be set to 0. If the STA supports 160 MHz, the Supported Channel Width Set field may be set to 1. If the STA supports both 160 MHz and 80+80 MHz, the Supported Channel Width Set field may be set to 2. 3 may be reserved as a value of the Supported Channel Width Set field.

The STA may selectively transmit one of the Operating Mode Notification field, the Supported Channel element, and the Supported Channel Width Set field described above with reference to FIG. 18 to 22, or transmit two or more of them in combination.

For DL MU transmission (e.g., DL MU-MIMO transmission or DL OFDMA transmission) from an AP to a plurality of STAs, the AP may allocate a plurality of subchannels to the plurality of STAs, or for UL MU transmission (e.g., UL MU-MIMO transmission or UL OFDMA transmission) from a plurality of STAs to an AP, the plurality of STAs may be allocated a plurality of subchannels by the AP. The subchannel allocation for the DL MU transmission or the UL MU transmission may be determined based on information about available resources for a related STA (i.e., the AP performing the DL MU transmission, the plurality of STAs receiving the DL MU transmission, the AP receiving the UL MU transmission, or one or more of the plurality of STAs performing the UL MU transmission). The available resource information about the STA may include one or more of information about an operating channel width (e.g., information included in an Operating Mode Notification field), information about a supported channel (e.g., information included in a Supported Channel element), or information about a supported channel width set (e.g., information included in a Supported Channel Width Set field). The subchannels for the DL MU transmission or the UL MU transmission may be dynamically determined based on the available resource information about the related STA.

For example, if the Channel Width field of an Operating Mode Notification element transmitted to the AP by each of STA1, STA2, STA3, STA4, STA5, and STA6 is set to a value indicating 20 MHz (e.g., 0), it may indicate that the STA can receive a PPDU on the primary 20-MHz channel but cannot receive a PPDU on a channel including the secondary 20-MHz channel, the secondary 40-MHz channel, and the secondary 80-MHz channel. If the Channel Width field of an Operating Mode Notification element transmitted to the AP by each of STA7, STA8, STA9, STA10, STA11, and STA12 is set to a value indicating 40 MHz (e.g., 1), it may indicate that the STA can receive a PPDU on a channel including the primary 20-MHz channel or the secondary 20-MHz channel but cannot receive a PPDU on a channel including the secondary 40-MHz channel or the secondary 80-MHz channel.

In this case, if the AP allocates subchannels to STA1, STA2, STA3, STA4, STA5, STA6, STA7, STA8, STA9, STA10, STA11, and STA12 and performs simultaneous DL transmissions to the STAs on the subchannels in DL OFDMA, the AP may allocate subchannels only within the primary 20-MHz channel on which STA1, STA2, STA3, STA4, STA5, and STA6 may operate to STA1, STA2, STA3, STA4, STA5, and STA6. In other words, STA1, STA2, STA3, STA4, STA5, and STA6 may not be allocated subchannels within the secondary 20-MHz channel, the secondary 40-MHz channel, and the secondary 80-MHz channel other than a channel having a channel bandwidth that STA1, STA2, STA3, STA4, STA5, and STA6 have declared (i.e., the primary 20-MHz channel). On the other hand, the AP may allocate subchannels within a channel including the primary 20-MHz channel and the secondary 20-MHz channel on which STA7, STA8, STA9, STA10, STA11, STA12 may operate to STA7, STA8, STA9, STA10, STA11, STA12. If the AP allocates subchannels to an STA(s) in consideration of information about an operating channel width of the STA(s), information about a supported channel of the STA(s), and information about a supported channel width set of the STA(s) as described above, a channel width in which the STA may perform a reception operation may be configured according to the width of a subchannel allocated to the STA. That is, the AP may configure a channel width for reception according to the width of a subchannel allocated to each of the STA(s), instead of configuring a large channel width for reception of the STA(s) according to a total channel width of a DL OFDMA PPDU transmitted by the AP (e.g., a TXVECTOR parameter, CH_BANDWIDTH). As a consequence, the power consumption of the STA may be reduced.

In the case of an SU PPDU or an MU-MIMO PPDU, the total channel width of the PPDU (e.g., a TXVECTOR parameter, CH_BANDWIDTH) may be determined to be one of channel widths included in a channel width set indicated by the Supported Channel Width Set field of a Capability element of a destination STA, not a channel width that is not included in the supported channel width set. Further, the total channel width of the SU PPDU or the MU-MIMO PPDU may be determined to be a channel width equal to or smaller than a channel width indicated by the Channel Width field of an Operating Mode Notification element, not a channel width exceeding the channel width indicated by the Channel Width field of the Operating Mode Notification element. Also, the total channel width of the SU PPDU or the MU-MIMO PPDU may be determined to be a channel width including a channel included in a channel list indicated by the Supported Channel element of the destination STA, not a channel width including a channel that is not included in the channel list.

Meanwhile, the total channel width of an OFDMA PPDU (e.g., a TXVECTOR parameter, CH_BANDWIDH) may be determined to be a channel width that is not included in a channel width set indicated by the Supported Channel Width Set field of a Capability element of a destination STA as well as a channel width included in the channel width set. The total channel width of the OFDMA PPDU may also be determined to be a channel width equal to or smaller than a channel width indicated by the Channel Width field of an Operating Mode Notification element of the destination STA or a channel width larger than the channel width indicated by the Channel Width field of the Operating Mode Notification element of the destination STA. Further, the total channel width of the OFDMA PPDU may be determined to be a channel width including a channel included in a channel list indicated by the Supported Channel element of the destination STA or a channel width including a channel that is not included in the channel list.

Herein, the AP may allocate subchannels to an STA(s), for DL OFDMA PPDU transmission or UL OFDMA PPDU transmission, in consideration of information about available resources for the STA(s) (e.g., one or more of information about an operating channel width (e.g., information included in an Operating Mode Notification field), information about a supported channel (e.g., information included in a Supported Channel element), or information about a supported channel width set (e.g., information included in a Supported Channel Width Set field)).

That is, the channel width of a "subchannel" allocated to an STA (e.g., a TXVECTOR parameter, SUBCH_BANDWIDTH), for OFDMA PPDU transmission may be determined to be one of channel widths included in a channel width set indicated by the Supported Channel Width Set field of a Capability element of the destination STA, not a channel width that is not included in the supported channel width set. Further, the channel width of the subchannel allocated to the STA (e.g., the TXVECTOR parameter, SUBCH_BANDWIDTH), for OFDMA PPDU transmission, may be determined to be a channel width equal to or smaller than a channel width indicated by the Channel Width field of an Operating Mode Notification element, not a channel width larger than the channel width indicated by the Channel Width field of the Operating Mode Notification element. The channel width of the subchannel allocated to the STA (e.g., the TXVECTOR parameter, SUBCH_BANDWIDTH), for OFDMA PPDU transmission may also be determined to be a channel width including a channel included in a channel list indicated by the Supported Channel element of the destination STA, not a channel width including a channel that is not included in the channel list.

Figure 23:
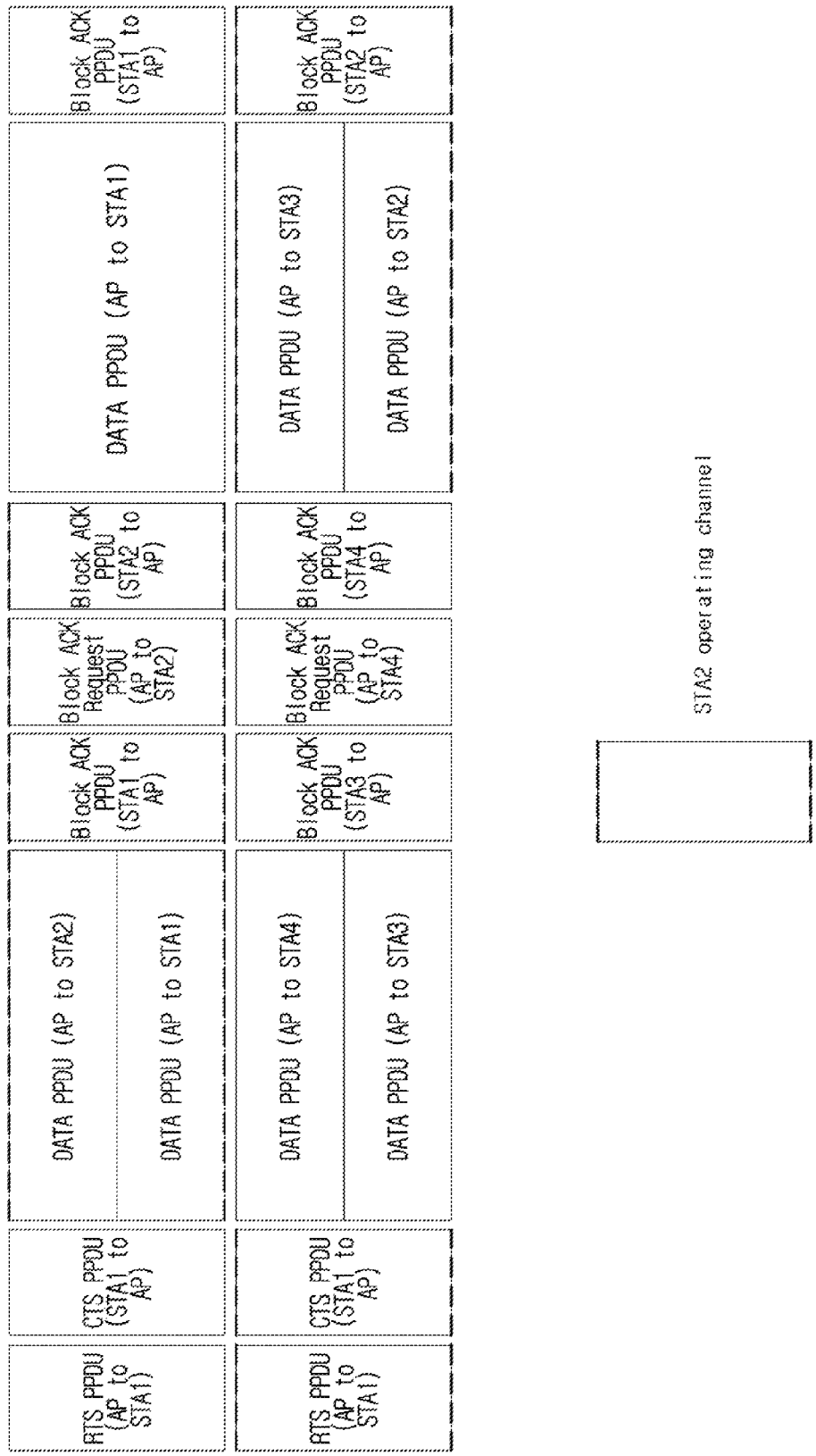
FIG. 23 depicts dynamic channel switching according to the present invention.

FIG. 23 depicts dynamic channel switching according to the present invention.

In the case where subchannels are allocated to STAs, for DL/UL MU transmission, STAs having small operating channel widths relative to other STAs are highly competitive for allocation of subchannels distinguished within limited resources. Thus, fairness may not be maintained between the STAs and the other STAs. For example, if an operating channel width of 20 MHz is configured for 10 STAs and an operating channel width lager than 20 MHz is configured for one STA among STAs supporting OFDMA in a HE BSS, all of the 10 STAs having the operating channel width of 20 MHz share the primary 20-MHz channel and thus they may be allocated subchannels distinguished within the limited primary 20-MHz channel in a contention-based manner, whereas the single STA having the operating channel width larger than 20 MHz may be allocated a subchannel within the secondary 20-MHz channel without contention. That is, an STA having a larger operating channel width may have a larger OFDMA gain than STAs having a smaller operating channel width.

To solve the fairness problem, dynamic channel switching (or dynamic subchannel switching) may be applied. Dynamic channel/subchannel switching (or dynamic channel/subchannel selection) refers to immediate switching from a current established channel/subchannel (e.g., a first channel/a first subchannel) to another channel/subchannel (e.g., a second channel/a second subchannel) for an STA during a frame exchange sequence between the STA and an AP.

If dynamic channel/subchannel switching (or dynamic channel/subchannel selection) is applied, the STA may change current configured channel information in the middle of one PPDU or during one TXOP. For example, an STA supporting dynamic channel/subchannel switching may change a receiving center frequency among current configured PHY setting vector parameters to the receiving center frequency of another channel in the middle of one PPDU or during one TXOP.

To support dynamic channel/subchannel switching in the middle of a PPDU, the AP may signal channel/subchannel allocation information to the STA before transmitting a HE-STF or a HE-LTF. For example, the AP may include subchannel allocation information (e.g., changed subchannel allocation information different from current configured subchannel allocation information) in a HE-SIG-A or a HE-SIG-B transmitted before a HE-STF or a HE-LTF transmitted on a subchannel in a PPDU. Accordingly, the STA may change the current receiving center frequency to the receiving center frequency of another channel during PPDU reception. For example, the STA may receive up to the HE-SIG-A or the HE-SIG-B of the PPDU on the primary 20-MHz channel and then receive the remaining part of the PPDU, starting from the HE-STF or the HE-LTF on a subchannel allocated in the secondary 20-MHz channel. In another example, an STA having an operating channel width of 40 MHz may receive up to a HE-SIG-A or a HE-SIG-B of a PPDU on a 40-MHz channel (i.e., across both the primary 20-MHz channel and the secondary 20-MHz channel) and then receive the remaining part of the PPDU, starting from a HE-STF or a HE-LTF on the primary 20-MHz channel (or the secondary 20-MHz channel).

To support dynamic channel/subchannel switching during a TXOP, the AP may signal information about a channel to be changed to an STA before a PPDU. For example, the information about the channel to be changed may be transmitted in a frame directed to the STA before transmission of the next OFDMA PPDU within the TXOP. Therefore, the STA may switch the current receiving center frequency to the receiving center frequency of another channel during the TXOP. For example, the STA may receive a first frame on the primary 20-MHz channel and a second frame on the secondary 20-MHz channel during a TXOP. In another example, an STA having an operating channel width of 40 MHz may receive a first frame on a 40-MHz channel (i.e., across both the primary 20-MHz channel and the secondary 20-MHz channel) and then receive a second frame on the primary 20-MHz channel (or the secondary 20-MHz channel).

Herein, one TXOP may include both DL MU transmission and UL MU transmission. For example, a UL MU PPDU transmission may be performed after a DL MU PPDU transmission during the same TXOP. That is, one or more of DL MU PPDU and UL MU PPDU sequences may be included within one TXOP. In this case, if a first frame is a DL PPDU and a second frame is a UL PPDU within one TXOP, the STA may receive the first frame on the primary 20-MHz channel and then transmit the second frame on the secondary 2-MHz channel.

Further, the AP may include information about a channel that the AP requests the STA to change in an RTS frame, a data frame, or a block ACK request frame. If the information about the channel (or subchannel) that the AP requests the STA to change corresponds to information that allocates a channel (or subchannel) on which an individual STA will perform UL transmission, this may be unicast trigger information (or a unicast trigger frame) for a single user. The unicast trigger information for the individual STA may be included in data (e.g., an MPDU or APDU) for the STA and may include information about the channel (or subchannel) allocated (i.e., dynamically switched) to the STA for UL MU transmission (e.g., UL OFDMA PPDU transmission) following the DL MU MIMO PPDU. For example, information that allocates a channel (or subchannel) on which a specific STA will transmit a block ACK may be included in a data frame or a block ACK request frame. Upon receipt of the information, the STA may transmit a block ACK frame on the allocated channel (or subchannel).

For dynamic channel/subchannel switching, the STA may transmit information about a channel (or subchannel) that it will change or has changed to the AP to receive the next PPDU. The information about a channel (or subchannel) that it will change or has changed, which is transmitted to the AP may be included in a feedback frame (or response frame) for a frame transmitted to the STA by the AP. The AP may determine a channel (or subchannel) to be allocated to the STA based on the information about a channel (or subchannel) that the STA will change (or has changed).

Further, the STA may notify the AP whether it supports dynamic channel/subchannel switching. Information indicating the STA's support or non-support of dynamic channel/subchannel switching may be included in a Capability element and may be included in an Association Request frame, a Reassociation Request frame, etc. Information indicating the AP's support or non-support of dynamic channel/subchannel switching may be included in a Capability element and may be included in an Association Response frame, a Reassociation Response frame, etc.

When the AP allocates a subchannel to an STA supporting dynamic subchannel switching, the AP may dynamically allocate a subchannel of a channel other than a current operating channel of the STA. For example, it is assumed that an operating channel width is set to 20 MHz, STA1 and STA2 support OFDMA, STA1 does not support dynamic subchannel allocation, and STA2 supports dynamic subchannel allocation. In this case, the AP may allocate a subchannel only within the primary 20-MHz channel to STA1. On the other hand, the AP may allocate a subchannel within the primary or secondary 20-MHz channel to STA2. However, it may be required that when the AP allocates a subchannel to STA2, the channel width of the subchannel (e.g., a TXVECTOR parameter, SUBCH_BANDWIDTH) is based on one or more of information about an operating channel width of STA2, information about a support channel of STA2, or information about a supported channel width set of STA2. That is, the AP may not allocate STA2 a subchannel that is not supported based on the information about an operating channel width of STA2, the information about a support channel of STA2, and the information about a supported channel width set of STA2.

It is assumed that the operating channel width of STA1 is 40 MHz and the operating channel width of each of STA2, STA3, and STA4 is 20 MHz in an exemplary frame exchange sequence of FIG. 23. It is also assumed that STA2 supports dynamic channel/subchannel switching and STA3 and STA4 do not support dynamic channel/subchannel switching.

To start a TXOP on a 40-MHz channel, the AP may transmit an RTS frame to STA1 in duplicated PPDUs on the primary 20-MHz channel (i.e., a low-frequency 20-MHz channel) and the secondary 20-MHz channel (i.e., a high-frequency 20-MHz channel). A destination STA of the RTS frame may be an STA having an operating channel width supporting the channel width (i.e. 40 MHz) of the TXOP. In other words, since STA2, STA3, and STA4 have an operating channel width of 20 MHz, STA2, STA3, and STA4 may not receive the RTS frame transmitted on the 40-MHz channel having the channel width of the TXOP and transmit a CTS frame on the 40-MHz channel. Therefore, STA1 supporting the 40-MHz operating channel width may be the destination STA of the RTS frame, and thus may transmit a CTS frame to the AP in duplicated PPDUs on the primary 20-MHz channel and the secondary 20-MHz channel.

Although the destination STA of the RTS frame and the transmitting STA of the CTS frame are STA1, STA2, STA3, STA4, and other STAs that operate on the channels carrying the RTS/CTS frame may receive the RTS/CTS frame and acquire information included in the RTS/CTS frame.

Meanwhile, since STA2, STA3, and STA4 support the 20-MHz operating channel width, they may be configured to operate basically on the primary 20-MHz channel. In contrast, STA1 supports the 40-MHz operating channel width and thus may operate on the primary or secondary 20-MHz channel. In this case, while STA2, STA3, and STA4 compete for subchannel allocation on the primary 20-MHz channel, STA1 may be allocated a subchannel on the secondary 20-MHz channel without contention with other STAs.

The operating channel of STA2 supporting dynamic channel/subchannel switching may be switched from the current operating channel, i.e., the primary 20-MHz channel to the secondary 20-MHz channel. For this purpose, the RTS frame may include signaling information requesting STA2 to switch (or move) the operating channel to the secondary 20-MHz channel. Therefore, STA3 and STA4 that do not support dynamic channel/subchannel switching may be allocated subchannels on the primary channel, and STA1 and STA2 may be allocated subchannels on the secondary channel. As a consequence, each of STA1, STA2, STA3, and STA4 may be allocated a 10-MHz channel and simultaneously receive a DL OFDMA PPDU on the 10-MHz channel.

Among STAs that have received the DL OFDMA PPDU on the 40-MHz channel, STA1 may transmit a block ACK PPDU to the AP on the primary 20-MHz channel and, at the same time, STA3 may transmit a block ACK PPDU to the AP on the secondary 20-MHz channel. Subsequently, the AP may transmit a block ACK request PPDU to STA4 on the primary 20-MHz channel and, at the same time, a block ACK request PPDU to STA2 on the secondary 20-MHz channel. STA4 may transmit a block ACK PPDU to the AP on the primary 20-MHz channel and, at the same time, STA2 may transmit a block ACK PPDU to the AP on the secondary 20-MHz channel, in response to the received block ACK request PPDUs.

In the absence of any more data to be transmitted to STA4, the AP may request STA2 to switch (or move) the operating channel of STA2 to the primary 20-MHz channel again. For this purpose, the AP may include information indicating dynamic channel/subchannel switching to STA2 in a data PPDU or a block ACK request PPDU. For example, the AP may include information about a channel to which STA2 is requested to switch in a data PPDU or a block ACK request PPDU. For example, the AP may include information about a channel to which STA2 is requested to switch in a block ACK request PPDU transmitted to STA2 on the secondary 20-MHz channel.

Therefore, the AP allocates a 10-MHz subchannel of the primary 20-MHz channel to each of STA2 and STA3, and the secondary 20-MHz channel to STA1 so that the AP may transmit a DL OFDMA PPDU simultaneously to STA1, STA2, and STA3.

Figure 24:
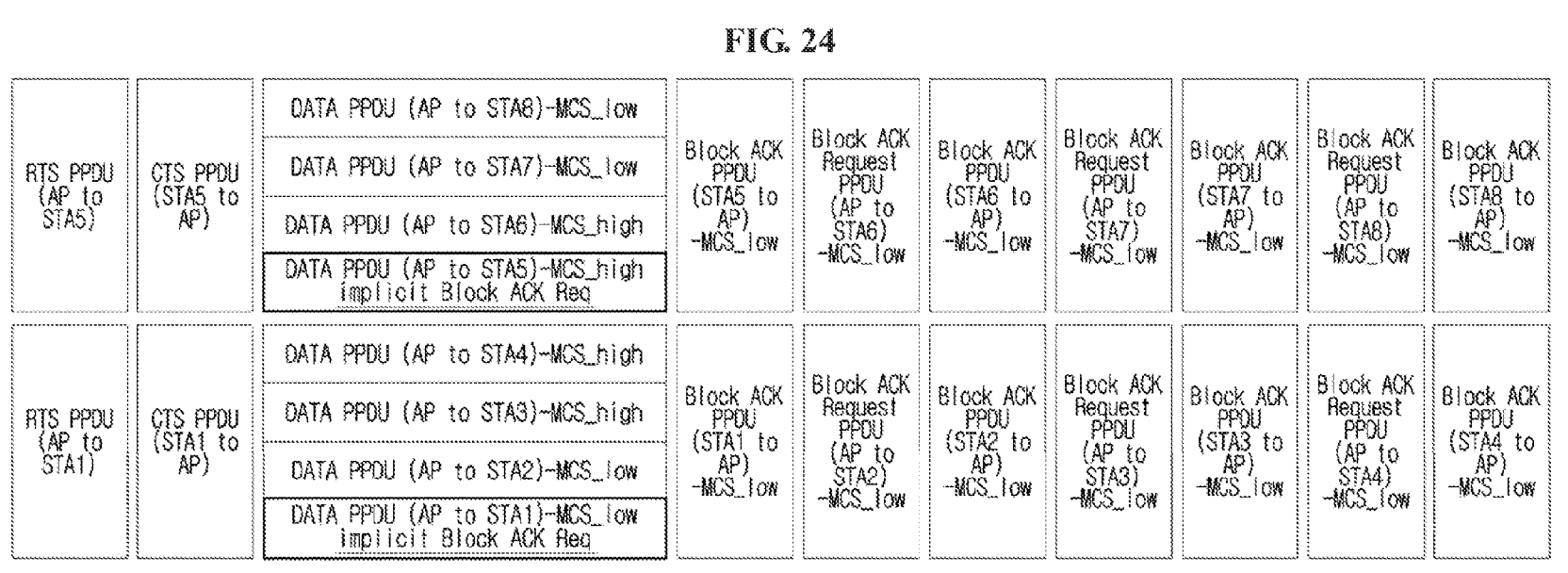

FIG. 24 depicts application of a transmission spectrum mask according to the present invention.

In the example of FIG. 24, the AP configures a total of eight 5-MHz subchannels on a 40-MHz channel for STA1, STA2, STA3, STA4, STA5, STA6, STA7, and STA8, and transmits a plurality of DATA PPDUs simultaneously on the eight 5-MHz subchannels to STA1, STA2, STA3, STA4, STA5, STA6, STA7, and STA8. Before simultaneously transmitting the plurality of DATA PPDUs, the AP may simultaneously transmit an RTS PPDU to STA1 on a primary 20-MHz channel and STA5 on a secondary 20-MHz channel and may receive a CTS PPDU from each of STA1 and STA5.

When the AP allocates a 5-MHz subchannel on a 40-MHz channel to each of STA1, STA2, STA3, STA4, STA5, STA6, STA7, and STA8 and transmits a plurality of DATA PPDUs simultaneously to STA1, STA2, STA3, STA4, STA5, STA6, STA7, and STA8, the ACK Policies of DATA PPDUs may be set to Implicit Block Ack Request only for one destination STA on one 20-MHz channel. Accordingly, collision may be prevented, which might otherwise be generated by simultaneous transmissions of block ACK PPDUs from a plurality of destination STAs.

Specifically, the ACK Policy of a DATA PPDU transmitted on one subchannel among DATA PPDUs transmitted on a plurality of subchannels of one 20-MHz channel may be set to Implicit Block Ack Request, and the ACK Policies of the DATA PPDUs transmitted on the other subchannels may be set to Block Ack Request in the example of FIG. 24. Therefore, upon receipt of the DL OFDMA PPDU, the plurality of STAs may transmit ACKs sequentially in time to the AP.

For example, if the ACK Policy of a DATA PPDU transmitted to STA1 on a first subchannel of the primary 20-MHz channel is Implicit Block Ack Request, STA1 may transmit a block ACK PPDU to the AP without receiving a block ACK request from the AP after receiving the DATA PPDU on the subchannel allocated to STA1. STA1 may transmit the block ACK PPDU across all subchannels including the subchannel allocated to STA1, not on only the subchannel (e.g., on the primary 20-MHz channel) allocated to STA1. Other STAs (STA2, STA3, and STA4) may receive block ACK request PPDUs from the AP and then transmit block ACK PPDUs to the AP according to the received block ACK request PPDUs. Herein, a block ACK request PPDU and a block ACK PPDU may be transmitted not on a subchannel carrying a related DATA PPDU but across all subchannels including the subchannel (e.g., on one channel).

Similarly, if the ACK Policy of STA5 is Implicit Block Ack Request on the secondary 20-MHz channel, STA5 may transmit a block ACK PPDU on the secondary 20-MHz channel after receiving a DATA PPDU on a subchannel allocated to STA5, whereas other STAs (STA6, STA7, STA8) may receive block ACK request PPDUs from the AP and then transmit block ACK PPDUs to the AP according to the received block ACK request PPDUs.

As described above, the ACK Policy of a DATA PPDU for one destination STA on each 20-MHz channel (e.g., STA1 on the primary 20-MHz channel and STA5 on the secondary 20-MHz channel) may be set to Implicit Block Ack Request. Accordingly, collision may be prevented, which might otherwise occur due to simultaneous transmissions of block ACK PPDUs on one 20-MHz channel from a plurality of STAs, and the block ACK PPDUs may be transmitted sequentially in time.

In the example of FIG. 24, the MCS values of DATA PPDUs for STA1, STA2, STA7, and STA8 are set to MCS_low and the MCS values of DATA PPDUs for STA3, STA4, STA5, and STA6 are set to MCS_high. When MU transmission of a plurality of DATA PPDUs is completed, the destination STAs (i.e., STA1 and STA5) for which the ACK Policies are set to Implicit Block Ack Request may transmit block ACK PPDUs corresponding to control response frames on the 20-MHz channels.

In FIG. 24, the MCS values of the block ACK PPDUs transmitted by STA1 and STA5 are set to MCS_low. For STA1, the MCS of the block ACK PPDU may be set to MCS_low, like the MCS of the DATA PPDU transmitted to STA1 by the AP, which is set to MCS_low. On the other hand, for STA5, although the MCS value of the DATA PPDU transmitted to STA5 by the AP is MCS_high, the MCS value of the block ACK PPDU transmitted in response to the DATA PPDU may be set to MCS_low. Thus, as the MCS values of frames transmitted simultaneously on the primary and secondary 20-MHz channels are set to the same value (e.g., the lowest MCS value in the case of a plurality of MCS values to be applied to simultaneously transmitted frames, or an MCS value preset by the AP), the simultaneously transmitted frames may have the same length.

Further, if a plurality of STAs simultaneously transmit PPDU frames, they may use the same transmission spectrum mask. If the plurality of STAs simultaneously transmit PPDUs using different transmission spectrum masks and one receiving STA receive the PPDUs, implementation complexity of the receiving STA may be increased significantly to support simultaneous reception of the transmissions to which the different transmission spectrum masks are applied at the receiving STA. Therefore, to reduce the implementation complexity of the receiving STA, the same transmission spectrum mask may be applied to the PPDU frames simultaneously transmitted by the plurality of STAs. In the example of FIG. 24, when STA1 and STA5 simultaneously transmit control response frames (e.g., block ACK PPDUs), STA1 and STA5 may use the same transmission spectrum mask.

The same transmission spectrum mask may be determined for the PPDU frames simultaneously transmitted by the plurality of STAs, based on a frame eliciting the simultaneously transmitted PPDU. Or the frame eliciting the simultaneously transmitted PPDU may include explicit information indicating the transmission spectrum mask.

For example, if STA1 and STA5 simultaneously transmit control response frames (e.g., block ACK PPDUs) as illustrated in FIG. 24, a transmission spectrum mask may be determined for use in transmission of the control response frames based on the total channel width of the DL OFDMA PPDU eliciting the transmission of the control response frames (e.g., an RXVECTOR parameter, CH_BANDWIDTH). Also, if STA2 and STA6 simultaneously transmit control response frames, a transmission spectrum mask may be determined for use in transmission of the control response frames based on the total channel widths of block ACK request PPDU frames eliciting the transmission of the control response frames.

That is, the total channel width of a first frame with an X-MHz channel width that a plurality of STAs receive (e.g., an RXVECTOR parameter, CH_BANDWIDTH) may be set to CBW X and an X-MHz transmission spectrum mask may be used for a second frame elicited by the first frame and transmitted by each of the plurality of STAs. If the channel width of the second frame is Y MHz, the second frame may be transmitted with the X-MHz transmission spectrum mask in both cases that X=Y and X>Y (or irrespective of the value of Y).

In the example of FIG. 24, although the channel widths of the block ACK PPDUs that STA1 and STA5 simultaneously transmit an SIFS after receiving the 40-MHz OFDMA PPDU (or the RXVECTOR parameter, CH_BANDWIDTH set to CBW 40) are 20 MHz, STA1 and STA5 may transmit block ACK PPDUs having a 20-MHz channel width using the same 40-MHz transmission spectrum mask. Also, although the channel widths of the block ACK PPDUs that STA2 and STA6 simultaneously transmit after receiving a 40-MHz block ACK request PPDU (or the RXVECTOR parameter, CH_BANDWIDTH set to CBW 40) are 20 MHz, STA2 and STA6 may transmit block ACK PPDUs with a 20-MHz channel width using the same 40-MHz transmission spectrum mask.

Similarly, upon receipt of an MU PPDU with a channel width of 160 MHz (or with the RXVECTOR parameter, CH_BANDWIDTH set to CBW160), an STA may transmit a frame (e.g., a frame with a channel width equal to or smaller than 160 MHz) using a 160-MHz transmission spectrum mask.

Also, upon receipt of an MU PPDU with a channel width of 80 MHz (or with the RXVECTOR parameter, CH_BANDWIDTH set to CBW80), an STA may transmit a frame (e.g., a frame with a channel width equal to or smaller than 80 MHz) using an 80-MHz transmission spectrum mask.

Also, upon receipt of an MU PPDU with a channel width of 20 MHz (or with the RXVECTOR parameter, CH_BANDWIDTH set to CBW20), an STA may transmit a frame (e.g., a frame with a channel width equal to or smaller than 20 MHz) using a 20-MHz transmission spectrum mask.

When dynamic channel/subchannel switching is applied, the same transmission spectrum mask may also be applied to simultaneously transmitted frames. For example, if another STA transmits a UL frame at the same time point when an STA transmits a UL frame on a dynamically switched channel/subchannel, the same transmission spectrum mask may be applied to the UL frames transmitted by the plurality of STAs. The transmission spectrum mask applied to the UL MU transmission may be determined based on a frame eliciting the UL MU transmission.

Transmission parameters applied to a plurality of data units that a plurality of STAs allocated a plurality of subchannels simultaneously transmit in UL MU transmission may include transmission parameters commonly applied to the plurality of data units and transmission parameters applied to the individual data units. Although a HE-SIG-A field of a HE PPDU may include a common transmission parameter for a plurality of data units simultaneously transmitted on a plurality of subchannels by a plurality of STAs, the HE-SIG-A field may not include transmission parameters applied to the individual data units.

Accordingly, for UL MU PPDU transmission from a plurality of STAs, the AP may indicate individual transmission parameters for application to a subchannel allocated to each of the STAs (e.g., the number of SSs, use or non-used of STBC, etc.) and regulate the STAs to follow scheduling information configured by the AP without fail. For this purpose, a trigger frame eliciting UL MU transmission may be used, as described before.

FIG. 25 depicts an exemplary format of a trigger frame.

As illustrated in FIG. 25, a trigger frame eliciting UL MU transmission may include a Common Info field and a Per-User Info field.

In the Common Info field, a UL MU Duration subfield indicates the transmission time of a UL HE PPDU transmitted simultaneously by a plurality of STAs.

A Total LTFs subfield indicates the number of HE-LTF symbols (e.g., the number of HE-LTF elements for each subchannel) included in the UL HE PPDU.

An LTF Duration subfield indicates the duration or length of a HE-LTF symbol (e.g., the duration or length of a HE-LTF element for each subchannel) included in the UL HE PPDU.

A Guard Interval subfield indicates a guard interval applied to the UL HE PPDU.

In the Per-User Info field, an Association Identifier (AID) subfield indicates an ID of an STA participating in the UL MU transmission.

An RU subchannel subfield indicates a subchannel that the STA uses in the UL HE PPDU transmission.

An RU MCS subfield indicates an MCS that the STA uses in the UL HE PPDU transmission.

An RU STS subfield indicates the number of Space-Time Streams (STSs) that the STA uses in the UL HE PPDU transmission.

An RU Beamformed subfield provides information about beamforming that the STA applies to the UL HE PPDU transmission.

An RU Coding subfield indicates coding (e.g., BCC or LDPC) that the STA uses in the UL HE PPDU transmission.

An RU Space-Time Block Coding (STBC) subfield indicates whether the STA will use STBC for the UL HE PPDU transmission.

As described before, when the AP allocates subchannels for DL MU transmission or UL MU transmission to a plurality of STAs, the AP may take into account information about available resources for the plurality of STAs (e.g., information about an operating channel width (e.g., information included in an Operating Mode Notification field), information about a supported channel (e.g., information included in a Supported Channel element), and information about a supported channel width set (e.g., information included in a Supported Channel Width Set field)). The AP may also configure information about its available resources (e.g., information about an operating channel width (e.g., information included in an Operating Mode Notification field), information about a supported channel (e.g., information included in a Supported Channel element), and information about a supported channel width set (e.g., information included in a Supported Channel Width Set field)). In this case, resource allocation information about a trigger frame requesting HE UL PPDU transmission may be configured so as to satisfy the UL/DL available resource information about the STAs and the UL/DL available resource information about the AP.

For example, it is assumed that the AP sets its receivable channel width to 40 MHz and the number of its receivable SSs to 4 and indicates the channel width and the number of SSs to a plurality of STAs. It is also assumed that the AP receives information indicating that a transmittable channel width of an STA (i.e. a maximum channel width of a UL PPDU transmittable by the STA as requested by the AP) is 80 MHz and the maximum number of SSs transmittable by the STA (i.e. the maximum number of SSs transmittable by the STA as requested by the AP) is 2. In this case, if the AP requests (or triggers) UL PPDU transmission to the STA, the AP may set resource allocation information (e.g., RU subchannel) to 40 MHz or below satisfying the AP's receivable channel width 40 MHz and the STA's transmittable channel width 80 MHz, in the trigger frame eliciting UL PPDU transmission. The AP may set SS allocation information (e.g., RU STS) to 2 or below satisfying the number of the AP's receivable SSs, 4 and the number of the STA's transmittable SSs, 2 in the trigger frame eliciting UL PPDU transmission.

Figure 26:
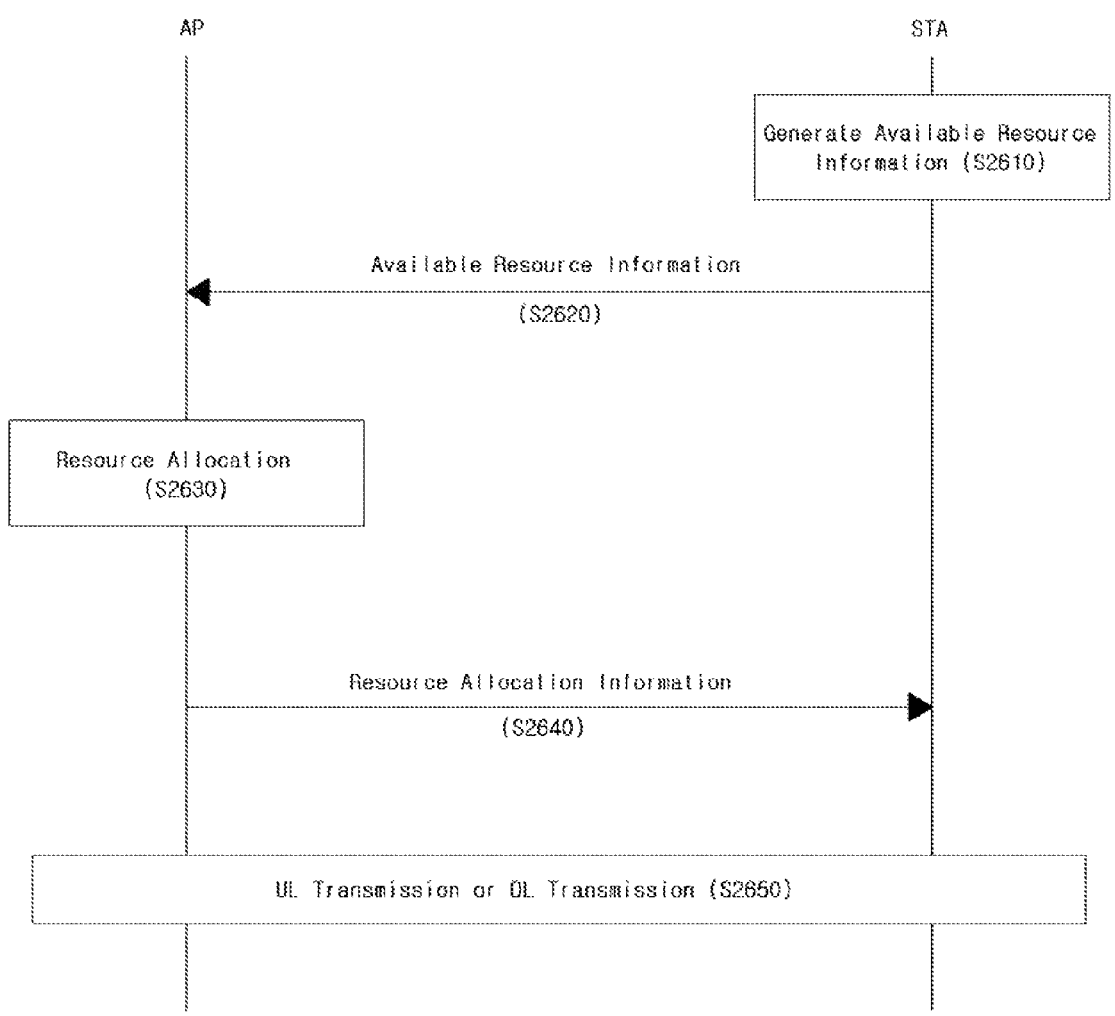
FIG. 26 depicts an exemplary method according to the present invention.

FIG. 26 depicts an exemplary method according to the present invention.

In step S2610, an STA may generate its available resource information (e.g., one or more of information about an operating channel width (e.g., information included in an Operating Mode Notification field), information about a supported channel (e.g., information included in a Supported Channel element), or information about a supported channel width set (e.g., information included in a Supported Channel Width Set field)).

In step S2620, the STA may transmit the generated available resource information to an AP and the AP may receive the available resource information from the STA. The AP may further receive available resource information from one or more other STAs.

In step S2630, the AP may generate resource allocation information for the STA based on available resource information about the AP and the available resource information about the STA. The resource allocation information may include one or more of channel allocation information, subchannel allocation information, or SS allocation information.

In step S2640, the AP may include the generated resource allocation information in a DL frame and transmit the DL frame to the STA, and the STA may receive the resource allocation information from the AP. For example, the resource allocation information may be included in a HE-SIG-A or HE-SIG-B field transmitted before a HE-STF or HE-LTF in a HE PPDU. Or the resource allocation information may be included in a first frame (e.g., a DL data frame, a block ACK request frame, or a trigger frame eliciting UL transmission). If resource allocation information for UL MU transmission or DL MU transmission is transmitted to the STA, resource allocation information for one or more other STAs may be transmitted to the one or more other STAs. Upon receipt of the resource allocation information from the AP, the STA may switch or move from current operating resources to resources indicated by the resource allocation information.

In step S2650, the STA may perform UL transmission or DL reception in the resources allocated by the resource allocation information, and the AP may perform UL reception or DL transmission in the resources allocated by the resource allocation information. If the resource allocation information is for UL MU transmission or DL MU transmission for the STA and the one or more other STAs, the STA may perform the UL MU transmission or DL MU reception simultaneously with the one or more other STAs, and the AP may perform UL MU reception from the STA and the one or more other STAs or DL MU transmission to the STA and the one or more other STAs.

The STA may receive the resource allocation information and perform the UL transmission or the DL reception based on the resource allocation information, in one PPDU. Or the STA may receive the resource allocation information in a first frame (e.g., a DL data frame, a block ACK request frame, or a trigger frame eliciting UL transmission) and transmit a UL second frame (e.g., an ACK frame, a block ACK frame, or a UL data frame) or receive a DL second frame (e.g., a DL data frame), within one TXOP.

If the STA receives a DL MU frame or transmits a UL MU frame simultaneously with one or more other STAs, the STA and the one or more other STAs may use the same spectrum mask. For example, a spectrum mask applied to the second frame may be determined based on the channel width of the first frame.

Figure 27:
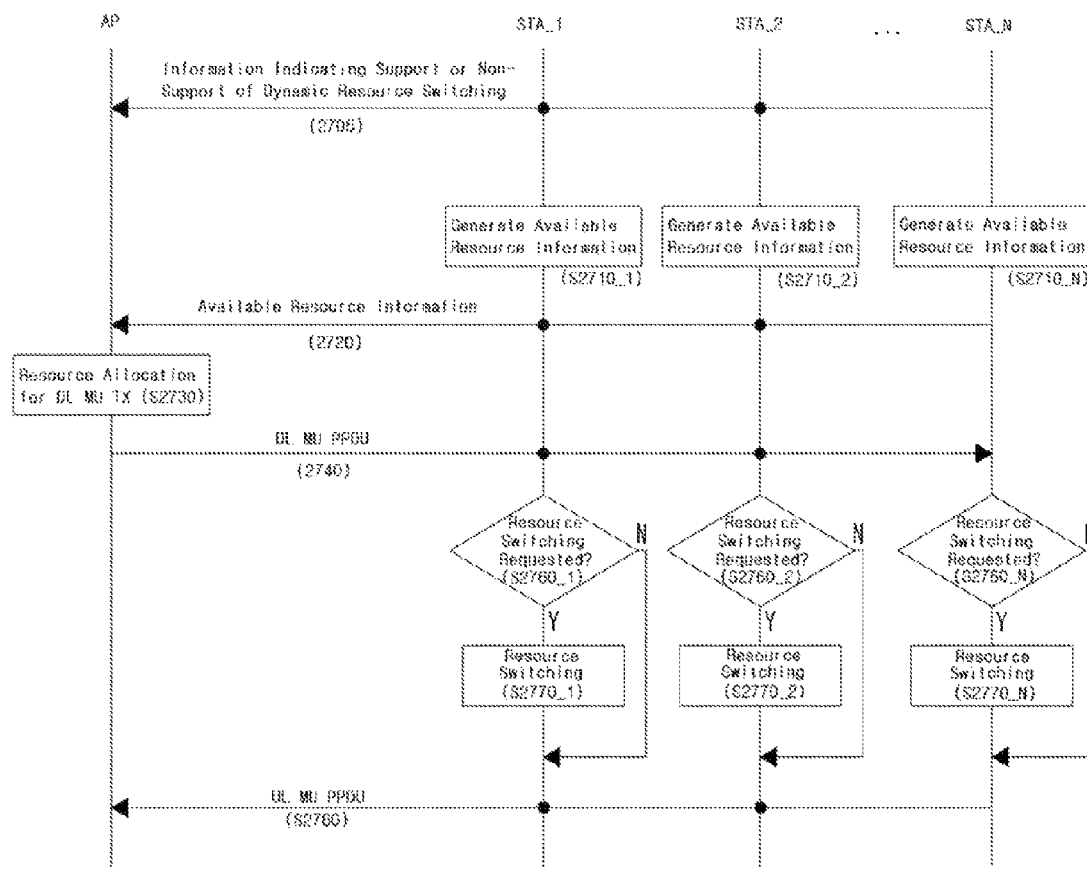
FIG. 27 depicts a Downlink Multi-User (DL MU) transmission method according to the present invention.

FIG. 27 depicts a DL MU transmission method according to the present invention.

In step S2705, each of a plurality of STAs (i.e., STA_1, STA_2, . . . , STA_N) may transmit to the AP information indicating whether the STA supports dynamic resource switching. In addition, information indicating whether the AP supports dynamic resource switching may be transmitted to the STAs. The information indicating whether the STA supports dynamic resource switching and the information indicating whether the AP supports dynamic resource switching may be exchanged before dynamic resource switching of the STA and the AP.

In steps S2710_1, S2710_2, . . . , S2710_N, STA_1, STA_2, . . . , STA_N may generate their available resource information. Each of steps S2710_1, S2710_2, . . . , S2710_N may correspond to step S2610 of FIG. 26.

In step S2720, STA_1, STA_2, . . . , STAN may transmit their available resource information to the AP and the AP may receive the available resource information. Step S2720 may correspond to step S2620 of FIG. 26.

In step S2730, the AP may generate resource allocation information for DL MU transmission to the plurality of STAs (e.g., one or more of channel allocation information, subchannel allocation information, or SS allocation information) based on the available resource information about the AP and the available resource information about the plurality of STAs. Step S2730 may correspond to step S2630 of FIG. 26.

In step S2740, the AP may transmit a DL MU PPDU to the plurality of STAs. First resource allocation information for DL MU transmission to the plurality of STAs may be transmitted before a HE-STF or HE-LTF (e.g., a HE-SIG field) in a DL HE PPDU. That is, step S2740 may correspond to steps S2640 and S2650 of FIG. 26. The plurality of STAs may receive the DL MU PPDU in resources indicated by the first resource allocation information. If current operating resources (e.g., resources used to receive the resource allocation information) are different from the resources indicated by the first resource allocation information, for an STA, the STA may perform resource switching after receiving the first resource allocation information and receive a field (e.g., a HE-STF, a HE-LTF, a PSDU, etc.) following a field (e.g., a HE-SIG field) carrying the first resource allocation information in the switched resources. In this manner, resources may be switched dynamically within one PPDU.

In addition, information requesting switching of operating resources for a specific STA (or resource switching request signaling information) in a frame (e.g., a UL MU PPDU) following the DL MU PPDU may be included in the DL MU PPDU. The resource switching request information may include resource allocation information (i.e., second resource allocation information) for a frame following the DL MU PPDU. In this manner, resources may be switched dynamically within one TXOP.

The DL MU PPDU may further include information indicating the bandwidth of a spectrum mask that an STA transmitting the following frame (e.g., the UL MU PPDU) will use. For example, the bandwidth of the transmission spectrum mask to be used for the frame following the DL MU PPDU may be determined implicitly from the bandwidth (e.g., X MHz) used for transmission of the DL MU PPDU (e.g., determined to be the same bandwidth as X MHz), or explicit information indicating the bandwidth of the transmission spectrum mask to be used for the frame following the DL MU PPDU may be included in the DL MU PPDU.

In step S2760_1, S2760_2, . . . , or S2760_N, each of STA_1, STA_2, . . . , STA_N may determine whether resource switching is requested to the STA. If the resource switching is requested, the STA may switch resources according to the second resource allocation information in step S2770_1, S2770_2, . . . , or S2770_N. On the other hand, if resource switching is not requested, the STA may not switch resources in step S2770_1, S2770_2, . . . , or S2770_N.

In step S2780, the plurality of STAs may simultaneously transmit a UL MU PPDU (e.g., UL MU control response frames including ACKs for the DL MU PPDU) to the AP. Herein, the plurality of STAs may use a transmission spectrum mask of the same bandwidth, for transmission of the UL MU PPDU. For example, the plurality of STAs may use a transmission spectrum mask of the same bandwidth (X MHz) as a transmission spectrum mask used for a frame triggering a UL MU PPDU frame (e.g., the DL MU PPDU transmitted shortly before the UL MU PPDU), for transmission of the UL MU PPDU. Or if the frame triggering the UL MU PPDU includes explicit information indicating the bandwidth of the transmission spectrum mask to be used for the UL MU PPDU, the plurality of STAs may use a transmission spectrum mask with the bandwidth indicated by the explicit information.

Figure 28:
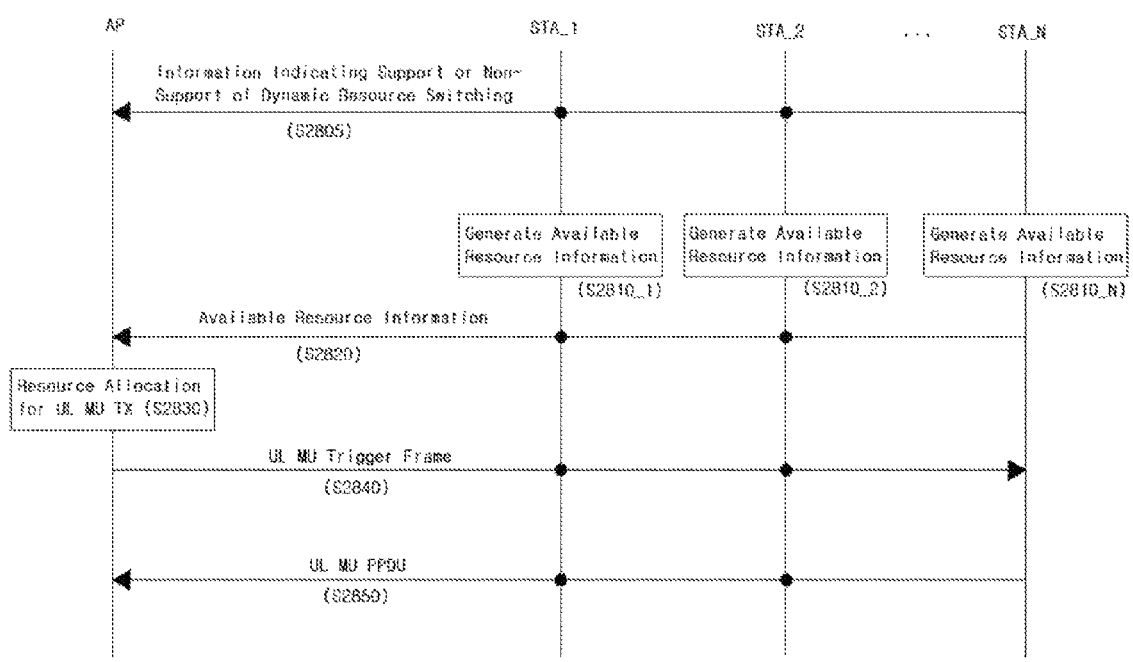
FIG. 28 depicts an Uplink Multi-User (UL MU) transmission method according to the present invention.

FIG. 28 depicts an exemplary UL MU transmission method according to the present invention.

In step S2805, each of the plurality of STAs (i.e., STA_1, STA_2, . . . , STA_N) may transmit to the AP information indicating whether the STA supports dynamic resource switching. In addition, the AP may transmit to the STAs information indicating whether the AP supports dynamic resource switching. The information indicating whether the STA supports dynamic resource switching and the information indicating whether the AP supports dynamic resource switching may be exchanged before dynamic resource switching of the STA and the AP.

In steps S2810_1, S2810_2, . . . , S2810_N, STA_1, STA_2, . . . , STA_N may generate their available resource information. Each of steps S2810_1, S2810_2, . . . , S2810_N may correspond to step S2610 of FIG. 26.

In step S2820, STA_1, STA_2, . . . , STA_N may transmit the available resource information to the AP and the AP may receive the available resource information from STA_1, STA_2, . . . , STA_N. Step S2820 may correspond to step S2620 of FIG. 26.

In step S2830, the AP may generate resource allocation information (e.g., one or more of channel allocation information, subchannel allocation information, or SS allocation information) for the plurality of STAs based on the available resource information about the AP and the available resource information about the plurality of STAs. Step S2830 may correspond to step S2630 of FIG. 26.

In step S2840, the AP may include the generated resource allocation information in a UL MU trigger frame and transmit the UL MU trigger frame to the plurality of STAs. Upon receipt of the resource allocation information, an STA may switch or move from current operating resources to resources indicated by the resource allocation information. Step S2840 may correspond to step S2640 of FIG. 26.

The UL MU trigger frame may further include information indicating the bandwidth of a spectrum mask that an STA transmitting a frame (e.g., a UL MU PPDU) triggered by the UL MU trigger frame will use. For example, the bandwidth of the transmission spectrum mask to be used for the triggered frame may be determined implicitly from the bandwidth (e.g., X MHz) used for transmission of the UL MU trigger frame (e.g., determined to be the same bandwidth as X MHz), or explicit information indicating the bandwidth of the transmission spectrum mask to be used for the triggered frame may be included in the UL MU trigger frame.

In step 2850, the plurality of STAs may simultaneously transmit a UL MU PPDU (e.g., a UL MU PPDU triggered by the UL MU trigger frame) to the AP. Step S2850 may correspond to step S2650 of FIG. 26.

Herein, the plurality of STAs may use a transmission spectrum mask of the same bandwidth, for transmission of the UL MU PPDU. For example, the plurality of STAs may use a transmission spectrum mask of the same bandwidth (X MHz) as a transmission spectrum mask used for the UL MU trigger frame, for transmission of the UL MU PPDU. Or if the UL MU trigger frame includes explicit information indicating the bandwidth of the transmission spectrum mask to be used for the UL MU PPDU, the plurality of STAs may use a transmission spectrum mask with the bandwidth indicated by the explicit information.

While the exemplary method has been described with reference to FIGS. 26 to 28 as a series of operations for simplicity of description, this does not limit the sequence of steps. When needed, steps may be performed at the same time or in a different sequence. All of the exemplary steps are not always necessary to implement the method proposed by the present invention.

The foregoing embodiments of the present invention may be implemented separately or combinations of two or more of the embodiments may be implemented simultaneously, for the method of FIGS. 26 to 28.

The present invention includes an apparatus for processing or performing the method of the present invention (e.g., the wireless device and its components described with reference to FIGS. 1, 2, and 3).

The present invention includes software (an operating system (OS), an application, firmware, a program, etc.) for executing the method of the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method performed by a station (STA) in a wireless local area network, the method comprising:
    transmitting, by the STA to an access point (AP), an operating mode field including a first subfield indicating a maximum number of streams that the STA supports for uplink multiple user (UL MU) transmission and a second subfield indicating whether uplink multiple user transmission is enabled or disabled, the streams relating to spaces, wherein the operating mode field is included in a High Efficiency (HE) Control field in a MAC (Medium Access Control) header;
    receiving, by the STA from the AP, a downlink frame including trigger information eliciting a next uplink multiple user (MU) frame immediately following the downlink frame, the trigger information including first resource allocation information for the next uplink MU frame, the first resource allocation information satisfying the maximum number of streams that the STA supports for uplink multiple user transmission; and
    processing, by the STA, the next uplink MU frame based on a resource indicated by the first resource allocation information.

2. The method according to claim 1, wherein the downlink frame is a downlink multiple user (DL MU) frame, and further includes a second resource allocation information.

3. The method according to claim 2, wherein the second resource allocation information is received before High Efficiency-Short Training Field (HE-STF) or High Efficiency-Long Training Field (HE-LTF) in the DL MU frame.

4. The method according to claim 3, wherein the STA switches to the resource indicated by the second resource allocation information to receive the HE-STF or HE-LTF on the resource indicated by the second resource allocation information.

5. The method according to claim 3, wherein the second resource allocation information is included in High Efficiency-SIGNAL (HE-SIG) in the DL MU frame.

6. The method according to claim 2, wherein the DL MU frame includes data units for the STA and one or more other STAs, and the UL MU frame includes acknowledgement (ACK) information of the STA and the one or more other STAs.

7. The method according to claim 2, wherein the DL MU frame includes a trigger frame for the UL MU frame, and the UL MU frame includes uplink data units transmitted from the STAs and one or more other STAs.

8. The method according to claim 2, wherein the DL MU frame includes block ACK request for the STA and one or more other STAs, and the UL MU frame includes block ACK information of the STA and the one or more other STAs.

9. The method according to claim 2, wherein the same transmit spectrum mask is determined based on a channel width of the DL MU frame.

10. The method according to claim 1, wherein the STA switches to the resource indicated by the first resource allocation information to transmit the UL MU frame on the resource indicated by the first resource allocation information.

11. The method according to claim 1, wherein a same transmit spectrum mask is used for the UL MU transmission by the STA and one or more other STAs.

12. A method performed by an access point (AP) in a wireless local area network, the method comprising:
    receiving, by the AP from a station (STA), an operating mode field including a first subfield indicating a maximum number of streams that the STA supports for uplink multiple user transmission and a second subfield indicating whether uplink multiple user transmission is enabled or disabled, the streams relating to spaces, wherein the operating mode field is included in a High Efficiency (HE) Control field in a MAC (Medium Access Control) header;
    transmitting, by the AP to the STA among a plurality of STAs, a downlink frame including trigger information eliciting a next uplink multiple user (MU) frame immediately following the downlink frame, the trigger information including first resource allocation information for next uplink MU frame, the first resource allocation information satisfying the maximum number of streams that the STA supports for uplink multiple user transmission; and
    processing, by the AP, the next uplink MU frame based on a resource indicated by the first resource allocation information.

13. The method according to claim 12, wherein the downlink frame is a downlink multiple user (DL MU) frame, and further includes a second resource allocation information.

14. The method according to claim 13, wherein the second resource allocation information is transmitted before High Efficiency-Short Training Field (HE-STF) or High Efficiency-Long Training Field (HE-LTF) in the DL MU frame.

15. The method according to claim 14, wherein the second resource allocation information is included in High Efficiency-SIGNAL (HE-SIG) in the DL MU frame.

16. The method according to claim 13, wherein:
    the DL MU frame includes data units for the STA and one or more other STAs, and the UL MU frame includes acknowledgement (ACK) information of the STA and the one or more other STAs,
    the DL MU frame includes a trigger frame for an uplink MU transmission, and the UL MU frame includes uplink data units transmitted from the STAs and the one or more other STAs, or
    the DL MU frame includes block ACK request for the STA and the one or more other STAs, and the UL MU frame includes block ACK information of the STA and the one or more other STAs.

\* \* \* \* \*